United States Patent [19]

Udagawa et al.

[11] Patent Number: 5,742,863
[45] Date of Patent: Apr. 21, 1998

[54] FILM HOLDER

[75] Inventors: Yoshibumi Udagawa; Yoichi Hamada; Takeshi Okano, all of Hyogo; Tokuji Sato, Saitama, all of Japan

[73] Assignee: Fuji Photo Film Co., Ltd., Kanagawa, Japan

[21] Appl. No.: 558,849

[22] Filed: Nov. 15, 1995

Related U.S. Application Data

[63] Continuation of Ser. No. 536,840, Sep. 28, 1995, which is a continuation-in-part of Ser. No. 186,569, Jan. 26, 1994, abandoned, which is a continuation-in-part of Ser. No. 107,601, Aug. 18, 1993, abandoned.

[30] Foreign Application Priority Data

| Aug. 24, 1992 | [JP] | Japan | 4-224074 |
| Aug. 26, 1992 | [JP] | Japan | 4-226910 |
| Aug. 26, 1992 | [JP] | Japan | 4-226911 |
| Aug. 26, 1992 | [JP] | Japan | 4-226912 |

[51] Int. Cl.$^6$ .................................................. G03B 17/26
[52] U.S. Cl. ........................................ 396/517; 396/522
[58] Field of Search ......................... 354/276, 277, 354/278, 281, 282, 283, 181, 182, 284, 285; 396/517, 522, 520

[56] References Cited

U.S. PATENT DOCUMENTS

| 3,751,253 | 8/1973 | Cohn | 354/276 |
| 4,725,865 | 2/1988 | Hoffman, Jr. | 354/276 |
| 4,821,055 | 4/1989 | Loose et al. | 354/282 |
| 4,937,605 | 6/1990 | Hoffman, Jr. | 354/276 |
| 4,994,835 | 2/1991 | Loose et al. | 354/282 |
| 4,994,836 | 2/1991 | Loose et al. | 354/282 |
| 5,130,731 | 7/1992 | Larsen et al. | 354/276 |

Primary Examiner—Safet Metjahic
Assistant Examiner—Nicholas J. Tuccillo
Attorney, Agent, or Firm—Young & Thompson

[57] ABSTRACT

When a photo film package is inserted into a film holder body, a clip abuts against a slide lever to move the slide lever, whereby stopper pieces are projected into a passing area. When the photo film package is inserted into the final position, the clip is engaged with engageable pawls. At the time of photographing, a light shielding envelope is pulled out to expose a film F. During the operation of pulling out the light shielding envelope, a stopper tape abuts against the stopper pieces, a slide plate is slidably moved through the pulling force of the light shielding envelope, a control plate interlocking this movement is moved, and push vanes of the control plate push guide vanes, whereby the engageable pawls are retracted from the positions of being engaged with the clips. When the slide plate is moved, a push plate is raised to push a film unit toward a top lid. When the photographing is completed, the light shielding envelope is moved in a direction of inserting, the slide plate is returned to the initial position and the push plate is returned to the initial position. Then, the film unit is housed in the light shielding envelope, and thereafter, the light shielding envelope together with the film unit are taken out of the film holder body.

9 Claims, 35 Drawing Sheets

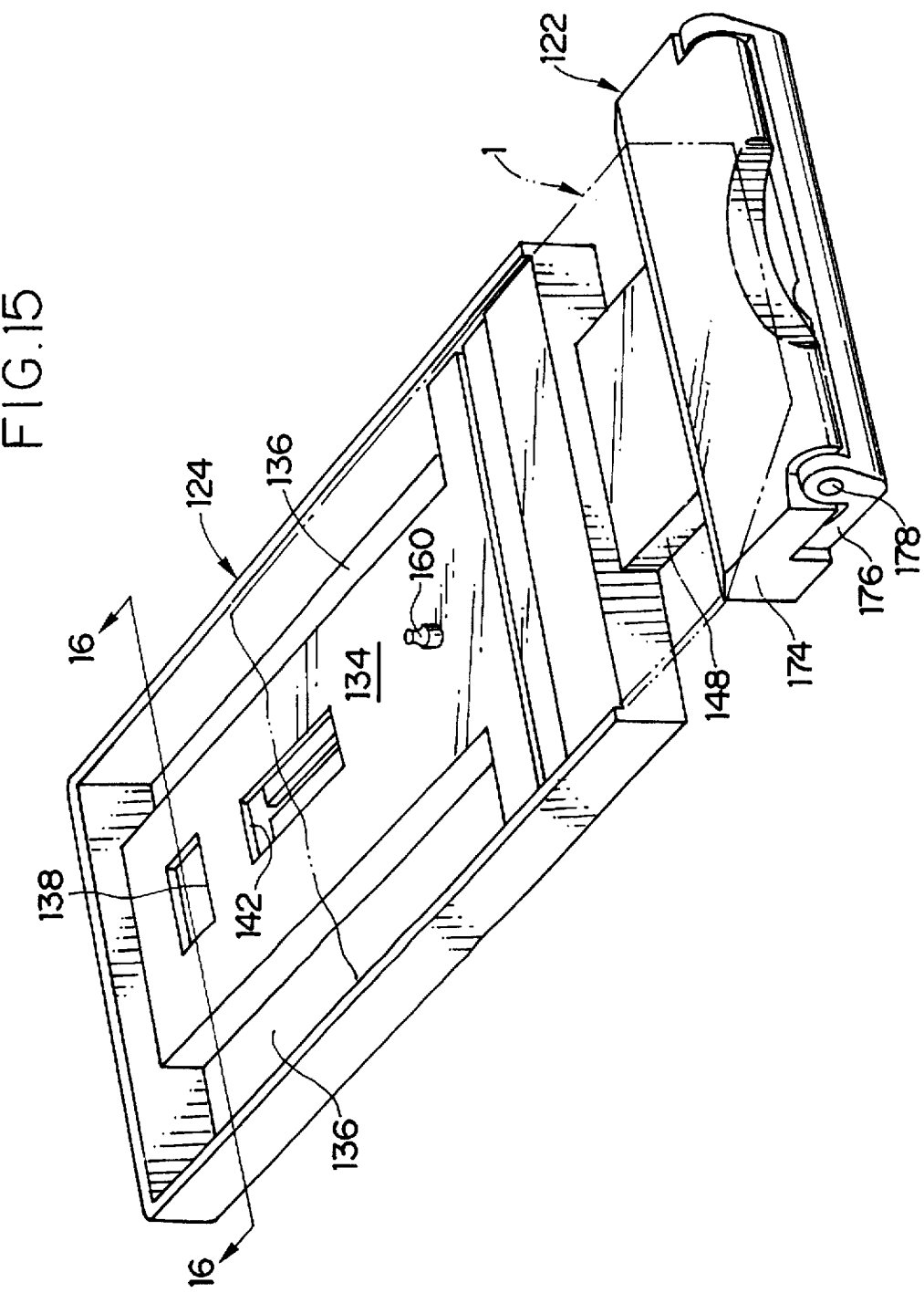

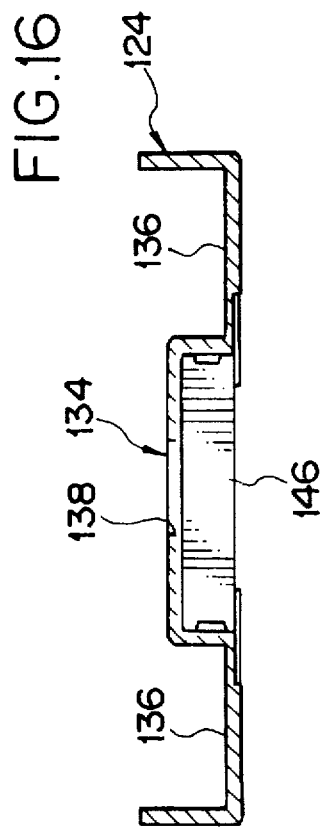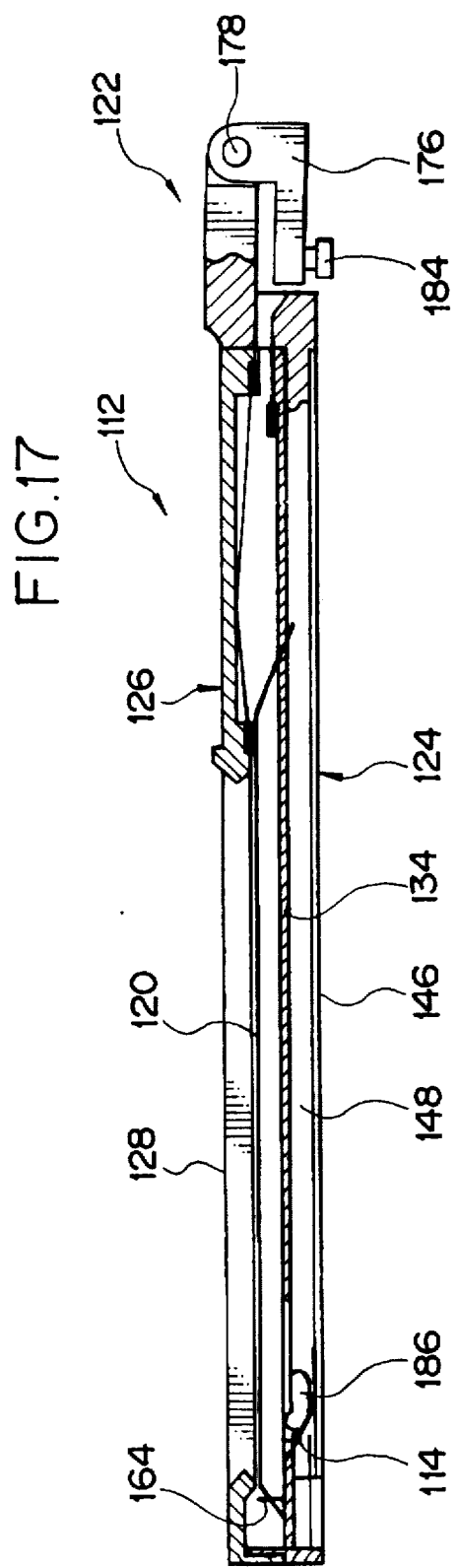

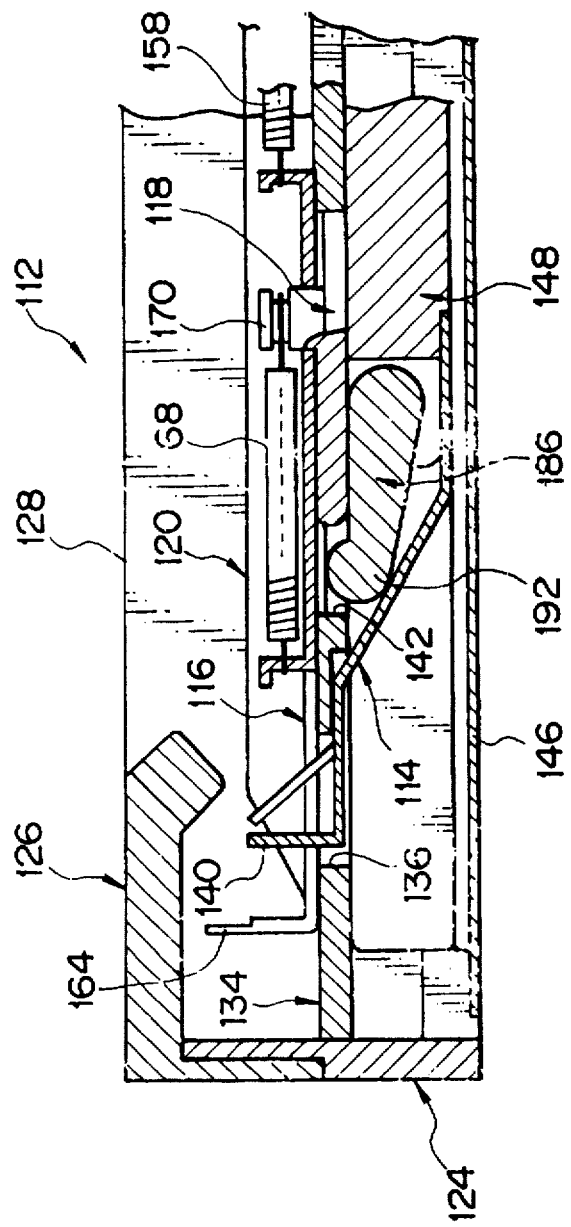

FILM HOLDER

This application is a continuation of pending application Ser. No. 08/536,840 filed Sep. 28, 1995; which is a continuation-in-part of application Ser. No. 08/186,569 filed Jan. 26, 1994 now abandoned; which is a continuation-in-part of application Ser. No. 08/107,601 filed Aug. 18, 1993, now abandoned.

BACKGROUND OF THE INVENTION

1. Field of the Invention

This invention relates to a film holder, and more particularly to a film holder mounted on a rear portion of a camera, for putting in a photo film package thereto and taking out the photo film package therefrom.

2. Description of the Related Art

As a photo film for professional use, there already is a photo film package for light shielding housing which is a sheet-shaped photo film having a relatively large size in a light shielding envelope.

The photo film package is of such an arrangement that a film unit is inserted into the light shielding envelope. The film unit includes the photo film and a carrier sheet. Furthermore, a clip is secured to the forward end edge portion of the film unit, and this clip can close an insert opening of the light shielding envelope when the film unit is housed in the light shielding envelope.

The photo film package is inserted into the film holder mounted on the rear portion of the camera with the clip being at the forward end. Then, by operating a release lever of the film holder, the clip is engaged in a film holder body. At the time of photographing, the rear end portion of the light shielding envelope is held between a user's fingers and only the light shielding envelope is pulled out, and the photo film is exposed through an exposure opening portion formed in the film holder. After the completion of photographing, the light shielding envelope is held between the user's fingers and pushed in and the insert opening of the light shielding envelope is closed, whereby the film unit is housed and light shielded. Then, after the release lever is set at a release position, the rear end portion of the light shielding envelope is held between the user's fingers, whereby the light—shielding envelope together with the film unit are pulled out of the film holder.

The film holder of this type has heretofore been formed of the film holder body provided thereon with a push plate, engageable pawls, release lever and the like.

The push plate is adapted to push and hold the photo film package inserted into the film holder body toward the exposure opening portion and to be constantly urged against the exposure opening portion unless the release lever is set at the release position.

Furthermore, the engageable pawls are engaged with the clip of the film unit, so as to hold the film unit in the film holder to prevent the film unit from being taken out together with the light shielding envelope during the photographing.

On the other hand, the release lever is adapted to simultaneously release the push of the push plate mad the engagement of the engageable pawls, and, by setting this release lever at the release position, the push plate is moved in a direction of being retracted from the film unit and the engageable pawls are moved in a direction of being disengaged from the clip. With this arrangement, the photo film .package which has completed the photographing can be taken out of the film holder body.

However, since, in the conventional film holder, a release bar must be operated when the photo film package is taken out of the film holder body, such a disadvantage is presented in that the user's attention is distracted because of the excessive operation and cannot concentrate on the photographing.

Furthermore, with the conventional film holder, there is a possibility that the light shielding envelope is pulled out obliquely when the light shielding envelope is pulled out of the film holder body during the photographing. In this case, there are presented such disadvantages that the film unit is pushed and inclined by the light shielding envelope, whereby a photographing frame is inclined, or, the film unit is damaged, whereby the photo film is adversely affected and the focusing is shifted.

Further, there is such a disadvantage that, when the light shielding envelope is pulled out forcibly, the stopper tape may be damaged.

SUMMARY OF THE INVENTION

The present invention has been developed to eliminate the above-described disadvantages and has as its object the provision of a film holder wherein a user's attention can be concentrated on the photographing without doing an excessive operation and the reliable pull-out of a light shielding envelope can be assured.

To achieve the above-described object, according to a first embodiment of the present invention, a film holder for housing a photo film package including a film unit secured at the forward end edge portion of a photo film thereof with a clip, and a light shielding envelope provided with an insert opening to be closed by the clip and a dislodging preventing member is secured in the vicinity of the insert opening, for light shielding housing in that the photo film is characterized in that said film holder comprises:

- a film holder body formed with an inlet/outlet opening for the photo film package and an exposure opening portion for exposing the photo film;
- a movable member slidably provided in the film holder body, urged in a direction of taking out the photo film package and abutted against the clip of the film unit to be moved together with the photo film package against the urging force in a direction of inserting the photo film package;
- a first engageable member provided in the film holder body and engaged with the clip when the photo film package is inserted into the final position, whereby the film unit is held in the film holder body;
- a slidable member slidably mounted in the film holder body and urged in the direction of inserting the photo film package;
- a second engageable member provided on the slidable member interlocking with the movement of the movable member in the direction of inserting the photo film package to be projected into an area, through which the photo film package passes, engaged with the dislodging preventing member of the light shielding envelope and interlocking with the movement of the movable member in the direction of taking out the photo film package to be retracted from the area, through which the photo film package passes;
- a releasing means for interlocking with the movement of the slidable member in the direction of taking out the photo film package to retract the first engageable member from a position of being engaged with the clip to thereby release the engagement with the clip;

a push member interlocking with the movement of the slidable member in the direction of taking out of the photo film package to push the film unit toward the exposure opening portion, and interlocking with the movement of the slidable member in the direction of inserting the photo film package to be retracted from the area, through which the photo film package passes; and a returning means interlocking with the movement of the photo film package in the direction of taking out to return the first engageable member to the position of being engaged with the clip;

during the operation of inserting the photo film package into the film holder body, the clip abuts against the movable member to move the movable member in the direction of inserting the photo film package, whereby the second engageable member is projected into the area, through which the photo film package passes, and the clip is engaged with the first engageable member when the photo film package is inserted into the final position;

during the operation of pulling out the light shielding envelope, the dislodging preventing member of the light shielding envelope comes up against the second engageable member, whereby the slidable member is moved in the direction of taking out the light shielding envelope, the releasing means releases the engagement of the first engageable means with the clip and the push member pushes the film unit toward the exposure opening portion;

during the operation of inserting the light shielding envelope, the slidable member returns to the initial position through its urging force, whereby the push member returns to the initial position, from which the push member has been retracted from the film unit; and during the operation of taking out the light shielding envelope together with the film unit, the movable member returns to the initial position through its urging force, whereby the second engageable member returns to the initial position, from which the second engageable member has been retracted from the passing area of the light shielding envelope, and the returning means returns the first engageable member to the position of being engaged with the clip.

To achieve the above-described object, according to a second invention of the present invention, a film holder for housing a photo film package including a film unit secured at the forward end edge portion of a photo film thereof with a clip and a light shielding envelope provided with an insert opening to be closed by the clip, for light shielding housing the photo film is characterized in that said film holder comprises:

a film holder body formed with an inlet/outlet opening for the photo film package and an exposure opening portion for exposing the photo film;

an engageable member engaged with the clip to engage the film unit in the film holder body when the photo film package is inserted into the final position in the film holder body;

a push plate provided in the film holder body, for pushing the film unit toward the exposure opening portion;

a guide member formed on the film holder body in a direction of inserting the photo film package; and an operating plate guided by a guide member to be moved for being put into the film holder body and taken out therefrom, whereby the operating plate is moved to be put in and taken out together with the light shielding envelope.

To achieve the above-described object, according to a third embodiment of this invention, a film holder for housing a photo film package including a film unit secured at the forward end edge portion of a photo film thereof with a clip and fixed at the backward end edge portion with a leader portion, and a light shielding envelope provided with an insert opening to be closed by the clip mad a dislodging preventing member secured in the vicinity of the insert opening, for light-tightly housing the photo film is characterized in that said film holder comprises:

a film holder body formed with an inlet/outlet opening for the photo film package and an exposure opening portion for exposing the photo film;

a first engageable member engaged with the clip to hold the film unit in the film holder body when the photo film package is inserted into the final position;

a second engageable member provided in the film holder body and engaged with the dislodging preventing member of the light shielding envelope;

a push plate provided in the film holder body, for pushing the film unit toward the exposure opening portion;

a release lever compressed in the direction of taking out the photo film package in the film holder body and moved against an compressing force, to thereby release an engagement with the film unit by the first engageable member and an engagement with the dislodging preventing member by the second engageable member; and a lock member for locking the release lever at a release position of the engageable members in interlocking with a release movement of the release lever, and for releasing the lock of the release lever when the photo film package is taken out in a predetermined value or is inserted.

Description will hereunder be given of the operations of putting in and taking out the photo film package by use of the film holder according to the first invention of the present application.

(1) Firstly, the photo film package is inserted through the inlet/outlet opening of the film holder body with the clip being at the forward end.

(2) After the insertion, the movable member detects the insertion and is moved in the direction of inserting the photo film package.

(3) When the movable member is moved, the second engageable member interlocks with this movement to be projected into the area, through which the photo film package passes.

(4) When the photo film package is inserted into the final position and set thereat, the clip of the photo film package is engaged with the first engageable member, whereby the film unit is held in the film holder body.

(5) Next, when the photographing is performed, only the light shielding envelope is pulled out, then the photo film of the film unit is exposed through the exposure opening portion of the film holder body because the film unit is held by the clip.

(6) During the operation of pulling out the light shielding envelope, the dislodging preventing member bonded to the light shielding envelope is engaged with the second engageable member, whereby the light shielding envelope can be prevented from being dislodged.

(7) When the light shielding envelope is further pulled in the direction of taking out from this state, the pulling force is imparted to the slidable member through the dislodging preventing member and the second engageable member, whereby the slidable member is moved in the direction of taking out the photo film package.

(8) When the slidable member is moved, the first engageable member is retracted from the position of being engaged with the clip, whereby the engagement with the clip is released and the push member pushes the film unit toward the exposure opening portion.

With this arrangement, the film unit can be held by the push member in the film holder body. Then, the photo film is photographed in this state.

(9) Next, when the photographing is completed, the light shielding envelope is moved again in the direction of inserting.

(10) When the light shielding envelope is moved in the direction of inserting, the slidable member interlocks with this movement to return to the initial position, and the push member also returns to the initial position and is retracted from the area, through which the photo film package passes.

(11) When the film unit is completely housed in the light shielding envelope, the user takes out the photo film package from the film holder body by one hand.

(12) When the photo film package is taken out, the movable member detects the take-out, the first engageable member is returned to the initial position, and the second engageable member is retracted from the area, through which the photo film package passes, and returned to the initial position. With this arrangement, the photo film package can be easily taken out without any resistance from the film holder body.

Accordingly, by use of the film holder of the present invention, the user can concentrate his attention at the photographing because the operation of the release bar is eliminated.

Furthermore, by use of the film holder of the present invention, the push member advances into the area, through which the photo film package passes, only when the light shielding envelope is pulled out of the film holder body, so that the inlet/outlet opening of the photo film package of the film holder body becomes larger than that in the conventional film holder. With this arrangement, the photo film package can be easily put into the film holder body and taken out therefrom and the photographed film can be assured.

Description will hereunder be given of the operations of putting in and taking out of the photo film package by use of the film holder according to the second embodiment of the present invention.

(1) Firstly, the photo film package is inserted through the inlet/outlet opening of the film holder body with the clip being the forward end.

(2) When the photo film package is inserted into the final position and set thereat, the clip is engaged with the engageable member, whereby the film unit is engaged in the film holder body.

(3) Next, when the photographing is performed, only the light shielding envelope is held by a holding portion of the operating plate and the operating plate is pulled out of the film holder body along the guide member. With this arrangement, the light shielding envelope and the operating plate can be pulled out along the guide member, so that the reliable pull-out of the light shielding envelope can be secured. Furthermore, when the light shielding envelope is pulled out as described above, the photo film of the film unit is exposed through the exposure opening portion because the film unit is held by the clip. This film unit is pushed by the push plate toward the exposure opening portion, whereby the film unit is fixed to the film holder body. The photo film is photographed in this state.

(4) Next, when the photographing is completed, the light shielding envelope is held by the holding portion, whereby the operating plate is housed in the film holder body along the guide member. Then, the photo film package is taken out of the film holder body.

On the other hand, a marking means is secured to the holding portion, whereby a mark can be stamped on the light shielding envelope when the holding portion holds the light shielding envelope. With this arrangement, the photo film package which has been photographed can be easily discriminated.

Description will be given of the operations of putting in and taking out the photo film package by use of the film holder according to the third invention of the present application.

(1) Firstly, the photo film package is inserted through the inlet/outlet opening of the film holder body with the clip being at the forward end.

(2) When the photo film package is inserted into the final position and set thereat, the clip is engaged with the first engageable member, whereby the film unit is held in the film holder body.

(3) Next, when the photographing is performed, the light shielding envelope is pulled out from the film holder body to the position where the dislodging preventing member is engaged with the second engageable member, then the photo film of the film unit is exposed through the exposure opening portion of the film holder body because the film unit is held by the first engageable member.

(4) Next, when the photographing is completed, the light shielding envelope is stored in the film holder body and the film unit is stored in the light shielding envelope.

(5) Then, the release lever is moved against the compressing power to thereby release the engagement of the first engageable member with the clip and the engagement of the second engageable member with the dislodging preventing member. At that time, the release lever is locked by the lock member at the release position of the engageable member.

(6) When the engagements with the clip and the dislodging preventing member are released, the photo film package is taken out from the film holder body. And, when the photo film package is taken out from the engageable member in the predetermined value or the next photo film package is inserted, the lock of the release lever is released by the lock member, then the release lever is returned to the former position by the compressing power.

Moreover, the mark showing that the release lever is locked at the release position is made on the film holder body, whereby it can be determined that the engagements with the clip and the dislodging preventing member are released.

BRIEF DESCRIPTION OF THE DRAWINGS

The exact nature of this invention, as well as other objects and advantages thereof, will be readily apparent from consideration of the following specification relating to the accompanying drawings, in which like reference characters designate the stone or similar parts throughout the figures thereof and wherein:

FIG. 15 is a perspective view of the film holder according to the second embodiment of the present invention;

FIG. 16 is a sectional view taken along the line 16—16 in FIG. 15;

FIG. 17 is an explanatory view of the operation of the film holder according to the second embodiment of the present invention;

FIG. 18 is an explanatory view of operation of the essential portions of the film holder according to the second embodiment of the present invention;

DESCRIPTION OF THE PREFERRED EMBODIMENTS

Detailed description will hereunder be given of the preferred embodiments of the film holder according to the present invention with reference to the accompanying drawings.

Firstly, description will be given of the photo film package used in the film holder according to the invention of the present application.

Figure 27:
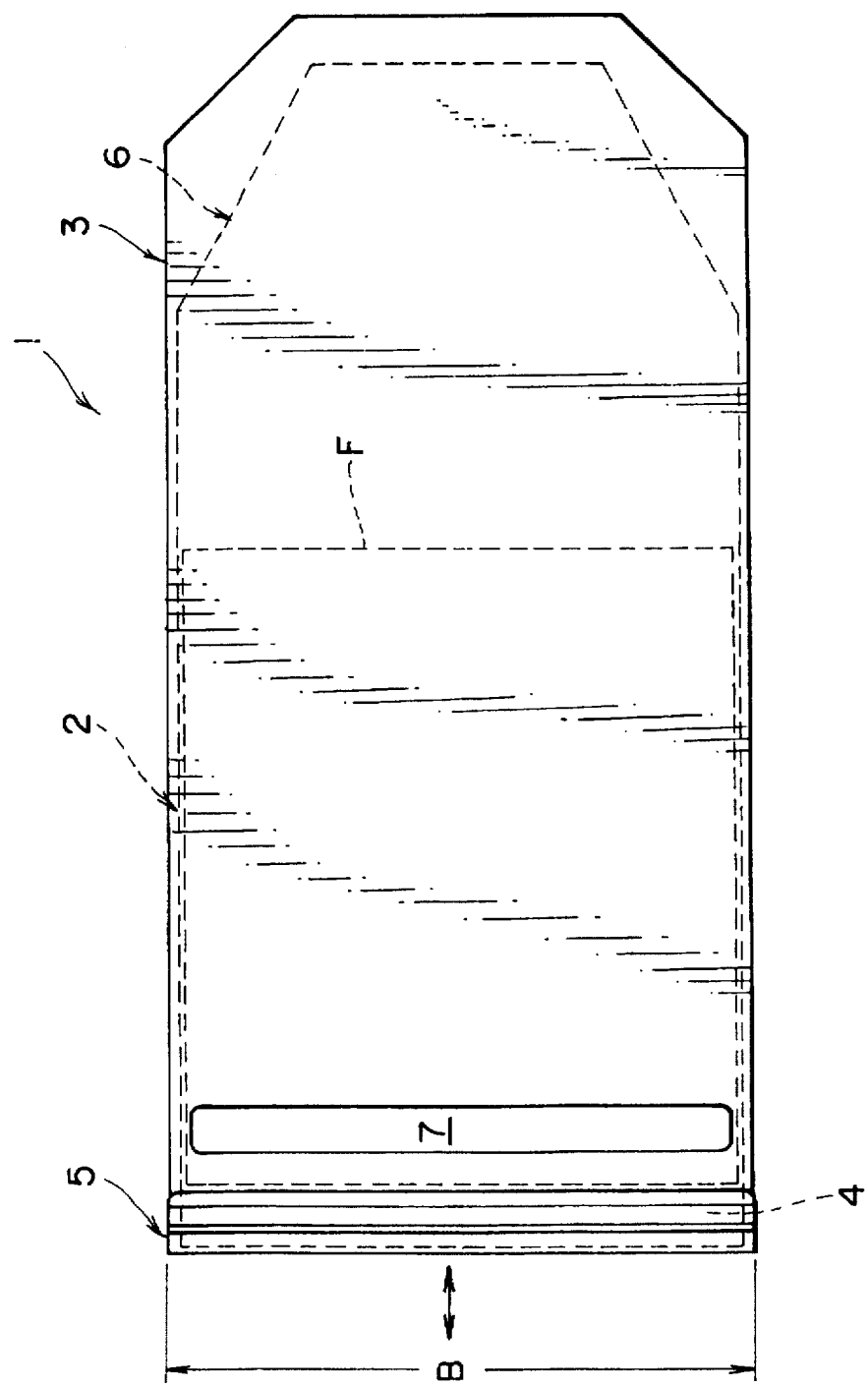
FIG. 27 is a plan view of the photo film package.
Figure 28:
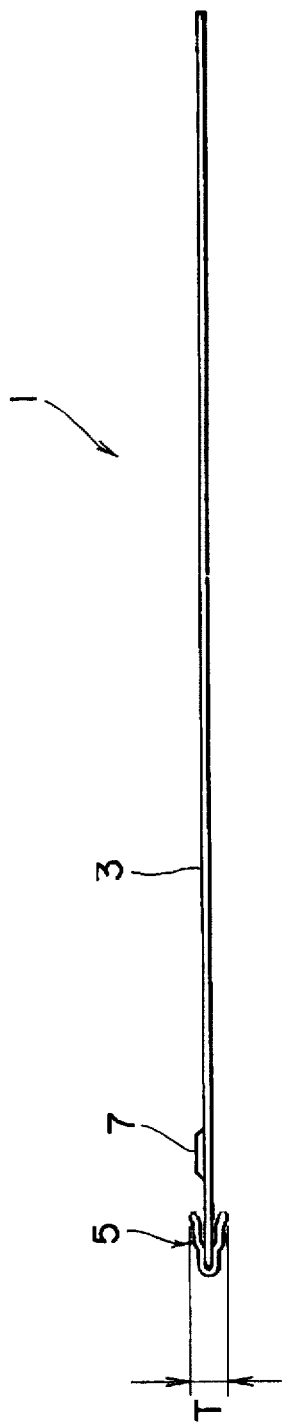
FIG. 28 is a side view of the photo film package.

As shown in FIG. 27, a photo film package 1 is constituted by a film unit 2 indicated by dashed lines in the drawing and a light shielding envelope 3. The film unit 2 has a photo film F, and a clip 5 is fastened to the forward end edge portion (to the left in the drawing) of this photo film F through a first carrier sheet 4. This clip 5 is formed to provide a substantially V-shape in cross section as shown in FIG. 28. Furthermore, as shown in FIG. 27, a trapezoidal second carrier sheet 6 is detachably jointed to the rear end edge portion of the photo film F. This second carrier sheet 6 is positioned in the vicinity of the rear end portion of the light shielding envelope 3 when the film unit 2 is housed in the light shielding envelope.

The light shielding envelope 3 is made of a light shielding member such as cardboard, and the film unit 2 is put into the light shielding envelope or taken out therefrom through an insert opening in the left, not shown, in directions indicated by arrows in FIG. 27. Furthermore, when the film unit 2 is housed in the light shielding envelope 3, the insert opening is closed by the clip 5. With this arrangement, the photo film F is prevented from being exposed.

Further, a belt-like stopper tape 7 is bonded to the light shielding envelope 3 in a direction of crossing the light shielding envelope 3 in the vicinity of the forward end portion of the light shielding envelope 3, and this stopper tape 7 is formed to have a predetermined thickness.

Figure 1:
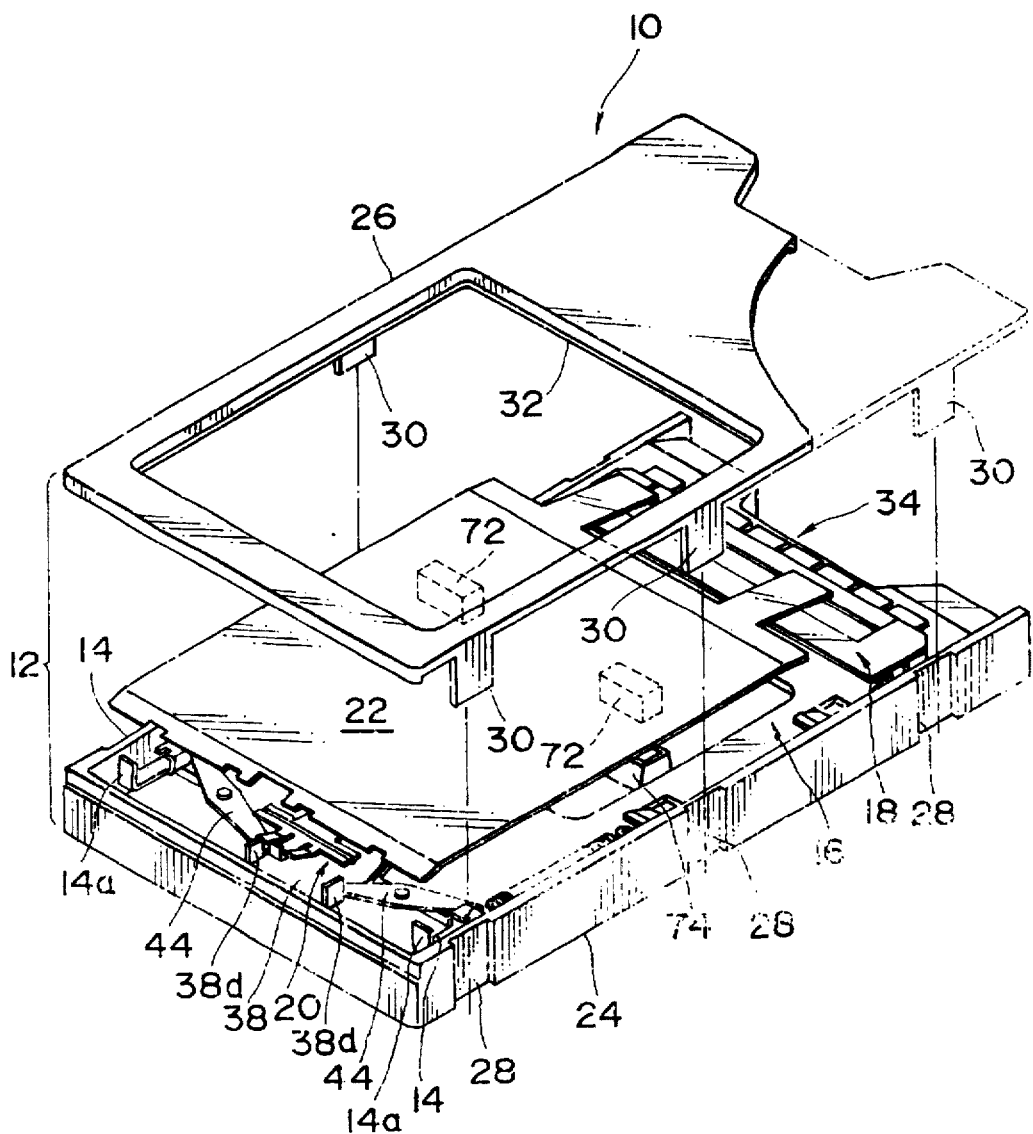
FIG. 1 is a perspective view including a partially broken away portion of the film holder according to the first embodiment of the present invention.
Figure 2:
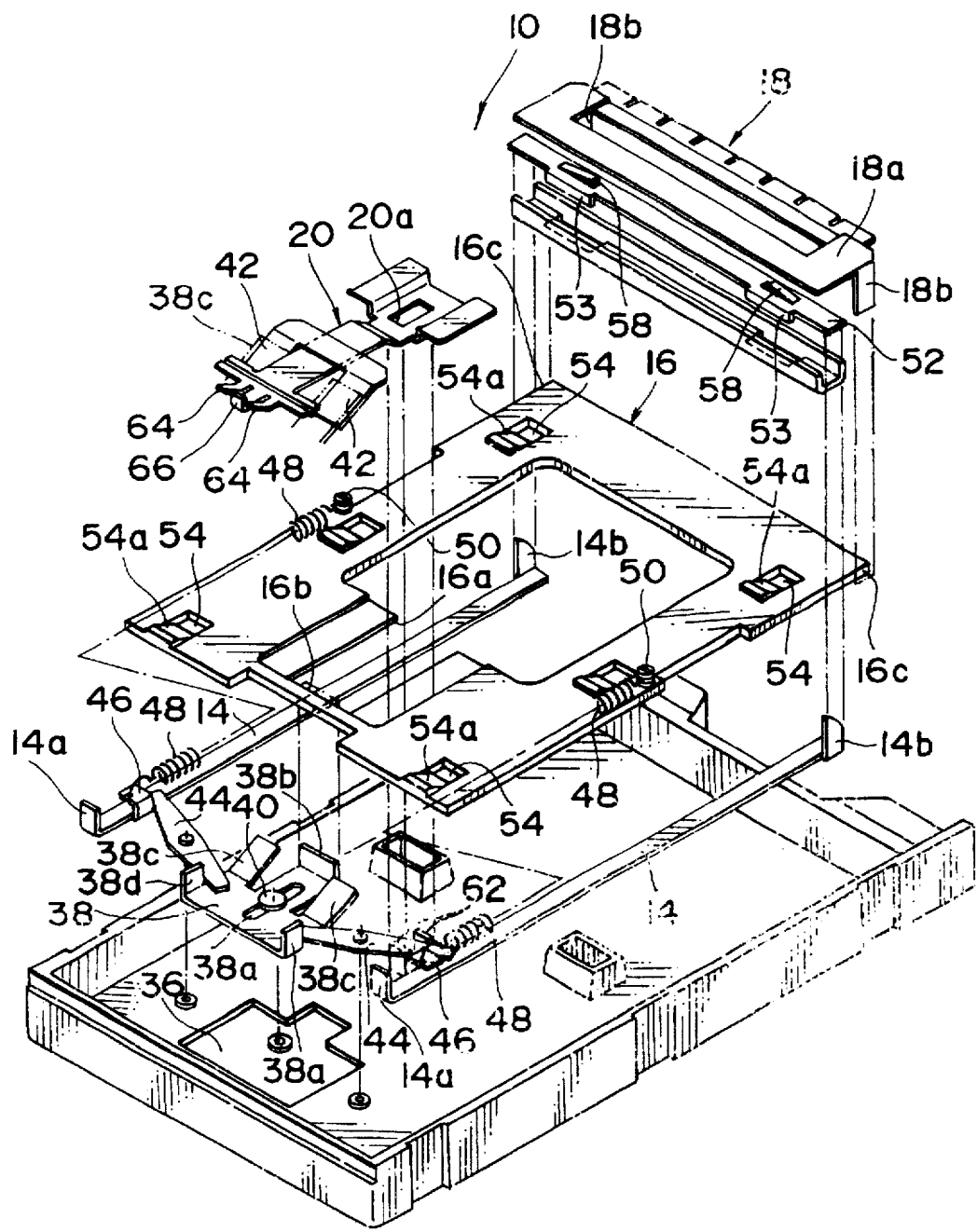
FIG. 2 is an exploded assembly view showing the film holder according to the first embodiment of the present invention.

FIG. 1 is the perspective view showing the first embodiment of a film holder 10, and FIG. 2 is the exploded assembly view thereof.

The film holder 10 is constituted by a film holder body 12, slide levers 14 and 14, a slide plate 16, a stopper portion 18, an engageable plate 20, and a push plate 22.

Firstly, the film holder body 12 will be described.

As shown in FIG. 1, the film holder body 12 includes a bottom lid 24 and a top lid 26. Engageable pieces 30 projectingly formed on the outer peripheral portion of the top lid 26 are engaged with engageable grooves 28 formed on the outer peripheral portion of the bottom lid 24 at predetermined intervals, thereby forming a box body. A rectangular exposure opening portion 32 is formed on the front surface of this film holder body 12, i.e. the outer surface of the top lid 26. This exposure opening portion 32 is the exposure opening portion for the photo film F as shown in FIG. 27.

An inlet/outlet opening 34 of the above-described photo film package 1 is formed at the right edge portion of the film holder body 12 as shown in FIG. 1. The photo film package 1 is put into the film holder body 12 and taken out therefrom through this inlet/outlet opening in directions indicated by an arrow in FIG. 27. The inlet/outlet opening 34 is formed to have dimensions for receiving a thickness T (FIG. 28) and a breadth B (FIG. 27) of the photo film package shown in FIGS. 27 and 28.

A recess 36 is formed at the left end portion of the bottom lid 24 as shown in FIG. 2 in the directions for putting into and taking out the photo film package 1. A control plate 38 is formed in the recess 36. The control plate 38 is formed therein with a slot 38a in the directions of putting in and taking out the photo film package 1. This slot 38a is slidably supported by a bolt 40 which is screwed and coupled to the upper surface of the recess 36. With this arrangement, the control plate 38 is slidably provided in the directions of putting in and taking out the photo film package 1.

Furthermore, a bent right end portion 38b of the control plate 38 is fixed to an edge portion 16b of a groove 16a formed at the left end portion of the slide plate 16 to be described hereunder. Further, a pair of push vanes 38c are integrally bent up on the control plate 38. These push vanes 38c are bent from and inclined by a predetermined angle to the control plate 38, and brought into pressing abutment with bifurcated guide vanes 42 fixed to the engageable plate 20 to be described hereunder. Furthermore, stopper pieces 38d are integrally bent up at both ends of the left end portion of the control plate 38. These stopper pieces 38d are in pressing abutment with stopper pieces 46 fixed to the slide levers 14 to be described hereunder through reset levers 44 rotatably mounted on the bottom lid 24.

Next, the slide levers 14 will be described.

The slide levers 14 are arranged at both sides relative to the directions of putting in and taking out the photo film package 1 of the bottom lid 24. The left end portions of the springs 48 are engaged with the stopper pieces 46 fixed to the slide levers, and the right end portions of the springs 48 are engaged with pins 50 projecting from the slide plate 16 to be described later. With this arrangement, the slide levers 14 are urged by the springs 48 in the direction of taking out the photo film package, and the slide plate 16 is urged by the springs 48 in the direction of inserting the photo film package 1.

Figure 5:
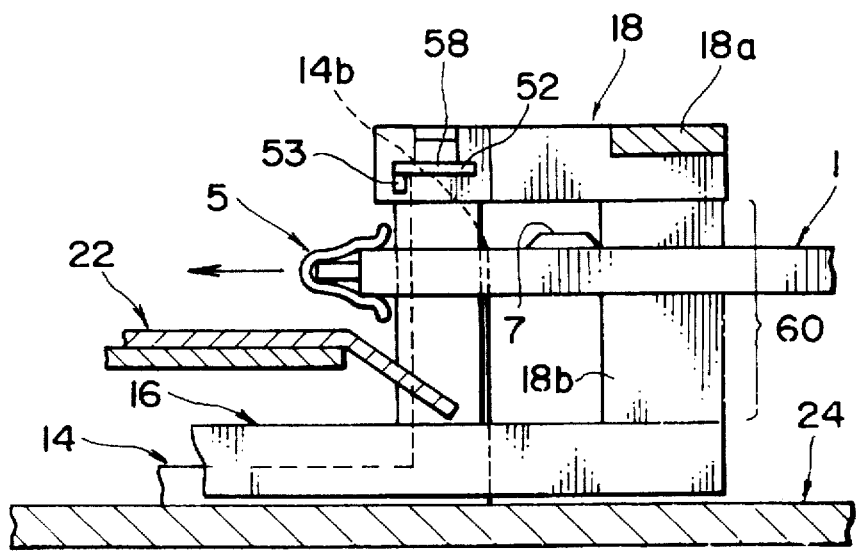
FIG. 5 is an explanatory view of operation of the film holder according to the first embodiment of the present invention.
Figure 6:
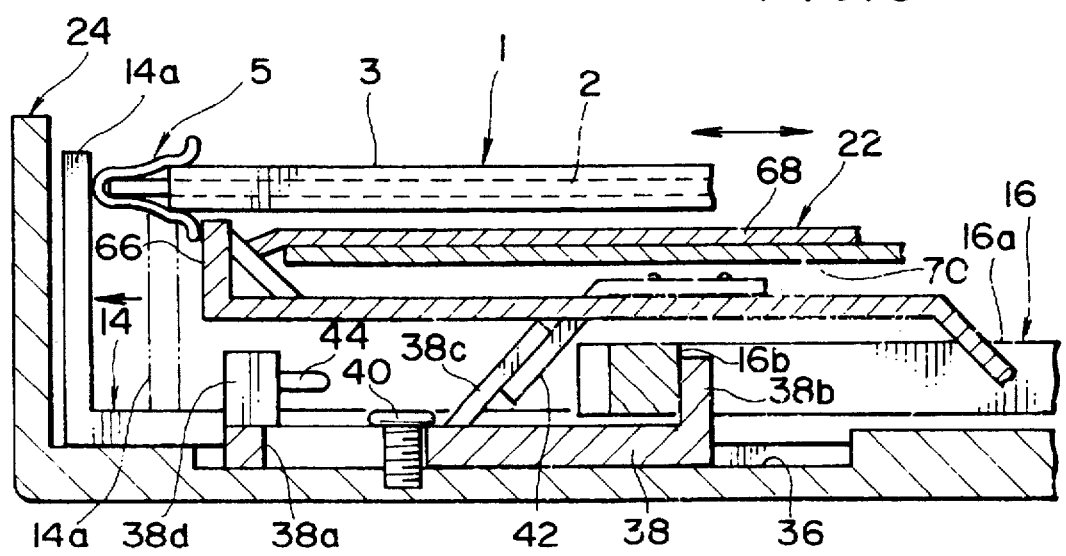
FIG. 6 is an explanatory view of operation of the film holder according to the first embodiment of the present invention.

Furthermore, opposite end portions 14a and 14b of the slide lever 14 are bent, the left end portions 14a are abutted against the clip 5 when the photo film package 1 is inserted as shown in FIG. 6, and the right end portions 14b are abutted against both end portions of a stopper plate 52 of the stopper portion 18 as shown in FIG. 5.

Next, the slide plate 16 will be described.

Figure 3:
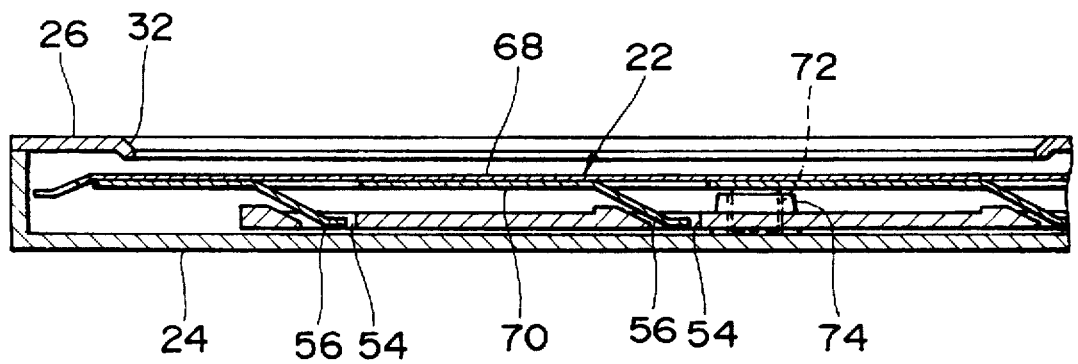
FIG. 3 is a sectional view showing an example of the push plate applied to the film holder according to the first embodiment of the present invention.

As shown in FIG. 2, the slide plate 16 is slidably provided on the bottom lid 24 in the directions of putting in and taking out the photo film package 1, and urged by the springs 48 in the direction of inserting the photo film package 1. Furthermore, three recessed portions 54 are respectively formed at each side of the slide plate 16 in the directions of putting in and taking out the photo film package 1. These recessed portions 54 are formed at positions corresponding to sheet springs 56, fixed to the bottom portion of the push plate 22 as shown in FIG. 3. Furthermore, in each of the recessed portions, there is formed an inclined portion 54a as shown in FIG. 2.

Next, the stopper portion 18 will be described.

As shown in FIG. 2, the stopper portion 18 includes a top plate 18a and a side plate 18b and is formed to provide a gate shape. The bottom end portion of the side plate 18b is fastened to the right end edge portion 16c of the slide plate 16. The photo film package 1 is put into and taken out from a space formed between the top plate 18a and the slide plate 16 as shown in FIG. 5. As shown in FIG. 2, the top plate 18a is provided thereon with the stopper plate 52. Stopper pieces 53 are bent in a downward direction from the stopper plate 52. Furthermore, the stopper plate 52 is urged downward by sheet springs 58 integrally formed on the stopper plate 52.

Figure 7:
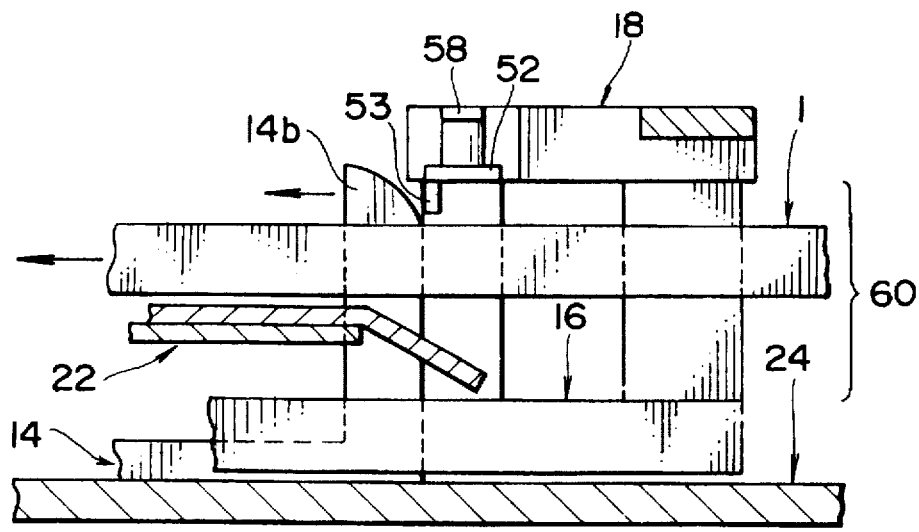
FIG. 7 is an explanatory view of operation of the film holder according to the first embodiment of the present invention.

With this arrangement, the stopper pieces 53 are retracted from the area, through which the photo film package 1 passes, when the end portions 14b of the slide levers 14 are abutted against the stopper plate 52, and, when the end portions 14b are moved in the direction of inserting the photo film package 1 as shown in FIG. 7, the stopper pieces 53 are projected into the area 60, through which the photo film package 1 passes, and are moved to positions where the stopper pieces 53 can be engaged with the stopper tape 7 of the photo film package 1.

Next, the engageable plate 20 will be described.

The engageable plate 20 is formed of an elastic member. An opening portion 20a, shown in FIG. 2, is engaged with a pair of pawls 62 disposed on the upper surface of the bottom lid 24, and the engageable plate 20 is fixed thereto. Furthermore, engageable pawls 64, 66 and 64 are bent up on the left end portion of the engageable plate 20. These engageable pawls 64, 66 and 64 are engaged with the clip 5 of the photo film package 1 as shown in FIG. 6.

Next, the push plate 22 will be described.

As shown in FIG. 3, two metal plates 68 and 70 are superposed on each other to thereby form the push plate 22. The above-described sheet springs 56, and a stopper portion 72 are fixed to the undersurface of the plate 70. This stopper portion 72 is coupled into a boss portion 74 formed on the surface of the bottom lid 24, so that the plate 22 is fixed to the bottom lid 24. Furthermore, at this time, the bottom end portions of the sheet springs 56, are coupled into the above-described recessed portions 54, of the slide plate 16.

Figure 4:
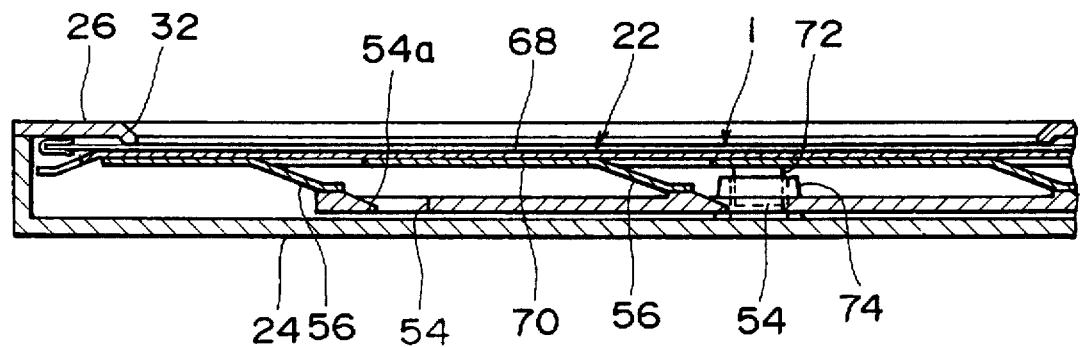
FIG. 4 is a sectional view showing another example of the push plate applied to the film holder according to the first embodiment of the present invention.

With this arrangement, when the sheet springs 56, are loosely coupled into the recessed portions 54, of the slide plate 16, the push plate 22 is located at a position of being retracted in a downward direction from the photo film package 1 as shown in FIG. 3. Furthermore, when the slide plate 16 is moved in the direction of taking out the photo film package 1, the sheet springs 56, of the push plate 22 run on the inclined portions 54a of the recessed portions 54 to raise the push plate 22 as shown in FIG. 4, whereby the push plate 22 pushes the film unit 2 toward the top lid 24.

Next, description will hereunder be given of the operations of putting in and taking out the photo film package 1 by use of the film holder 10 having the above-described arrangement.

(1) Firstly, the photo film package 1 is inserted with the clip 5 being at the forward end by one hand through the inlet/outlet opening 34 of the film holder body 12.

(2) During the insertion of the photo film package 1, the photo film package 1 is inserted without being subjected to the resistance by the push plate 22, because the push plate 22 is retracted to the position downwardly from the photo film package 1 as shown in FIG. 5, and the clip 5 of the film unit 2 abuts against the left end portion 14a of the slide lever 14 indicated by two-dot chain lines in FIG. 6. Then, the slide lever 14, being pushed by the photo film package 1, is slidably moved to a position indicated by solid lines.

(3) When the slide lever 14 is moved in the above-described direction, the right end portion 14b of the slide lever 14 is retracted from the stopper plate 52 as shown in FIG. 7, whereby the stopper pieces 53 are projected into the area 60, through which the photo film package 1 passes.

(4) When the photo film package 1 is inserted into the final position, the clip 5 of the photo film package 1 is engaged with the engageable pawls 64, 66 and 64 as shown in FIG. 6. With this arrangement, the film unit 2 is held in the film holder body 12.

Figure 8:
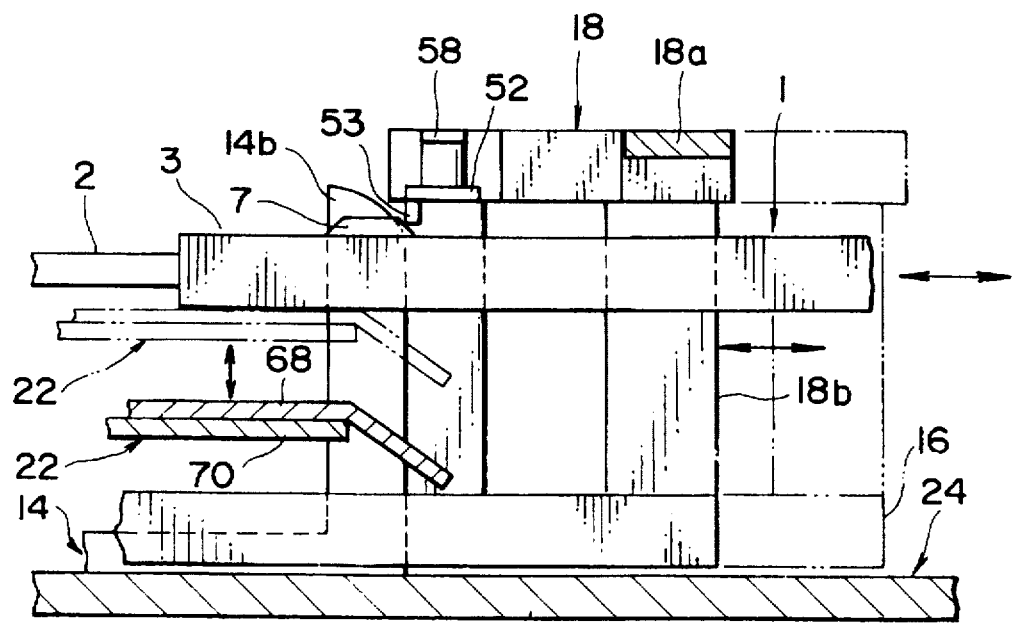
FIG. 8 is an explanatory view of the operation of the film holder according to the first embodiment of the present invention.
Figure 9:
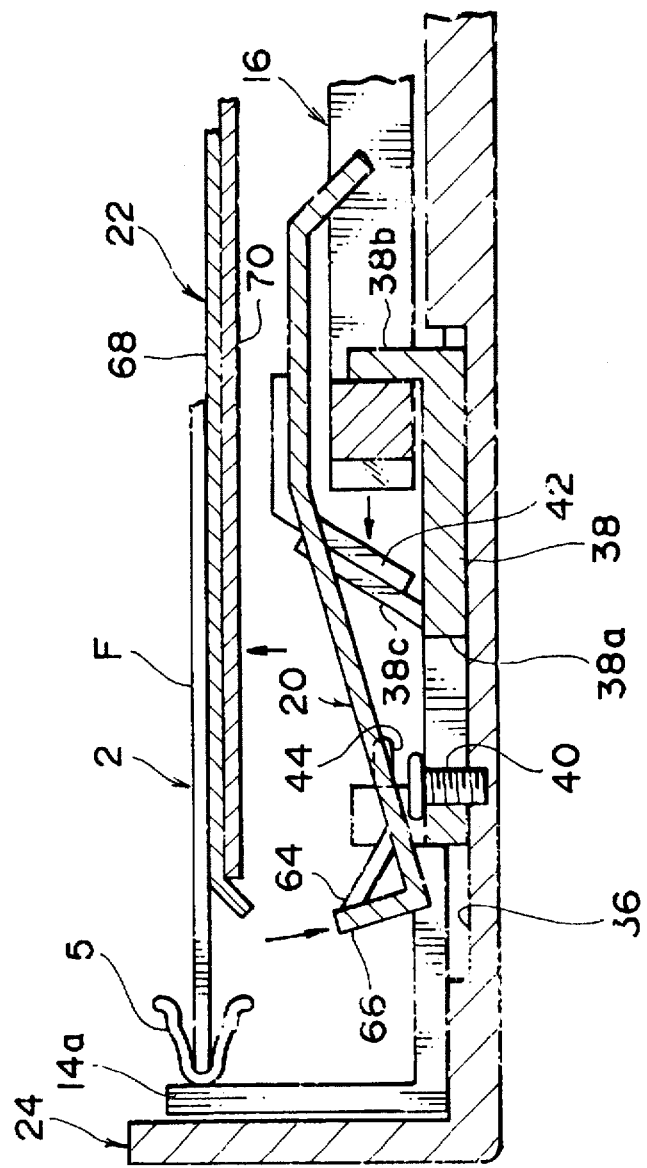
FIG. 9 is an explanatory view of the operation of the film holder according to the first embodiment of the present invention.

(5) Next, when the photographing is to be performed, only the light shielding envelope 3 is pulled out by hand as shown in FIG. 8, whereby the photo film F of the film unit 2 is exposed through the exposure opening portion 32 (refer to FIG. 1) of the film holder body 12 as shown in FIG. 9.

(6) During the operation of pulling out the light shielding envelope 3, the stopper tape 7 bonded to the light shielding envelope 3 came up against the stopper pieces 53 as shown in FIG. 8, whereby the light shielding envelope 3 is prevented from being dislodged from the film holder body 12.

(7) Then, when the light shielding envelope 3 is further pulled in this state, the pulling force is imparted to the slide plate 16 through the stopper tape 7 and the stopper pieces 53, whereby the slide plate 16 is moved in the direction of taking out the photo film package 1 as indicated by two-dot chain lines in FIG. 8.

(8) When the slide plate 16 is moved in the above-described direction, the control plate 38 shown in FIG. 9 interlocks with this movement to be moved in the direction of taking out the photo film package 1. Then, the push vanes 38c of the control plate 38 push the guide vanes 42 of the engageable plate 20, whereby the engageable plate 20 is elastically deformed. With this arrangement, the engageable pawls 64, 66 and 64 are retracted from the positions of being engaged with the clip 5, whereby the engagement with the clip 5 is released. Furthermore, when the slide plate 16 is moved in the above-described direction, the sheet springs 56 run on the inclined portions 54a of the slide plate 16 to raise the push plate 22 as shown in FIG. 4, whereby the push plate 22 pushes the film unit 2 shown in FIG. 9 toward the top lid 26.

With this arrangement, the film unit 2 is held in the film holder body 12 by the push plate 22. Then, the photo film F is exposed in this state.

(9) When the photographing is completed, the light shielding envelope 3 is moved by one hand in the direction of inserting the photo film package 1.

(10) When the light shielding envelope 3 is moved in the above-described direction, during this operation, the slide plate 16 is returned to the initial position through the urging force of the springs 48 shown in FIG. 2 and the push plate 22 is returned to the initial position. Incidentally, even if the slide plate 16 is returned to the initial position, the engageable plate 20 is kept in the state of being disengaged from the clip 5 by the control plate 38.

(11) When the film unit 2 is housed in the light shielding envelope 3, the light shielding envelope 3 together with the film unit 2 is taken out by one hand from the film holder body 12. At this time, the clip 5 is not engaged with the engageable pawls 64, 66 and 64 and the push plate 22 is retracted to the position downwardly of the photo film package 1, so that the photo film package 1 can be taken out without any resistance.

Figure 10:
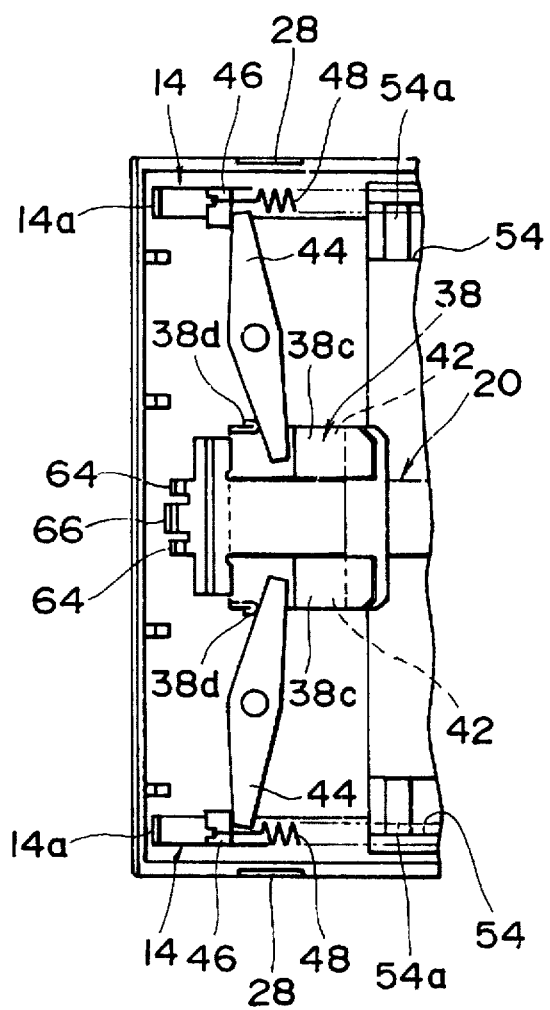
FIG. 10 is an explanatory view of the operation of the film holder according to the first embodiment of the present invention.

(12) Furthermore, when the photo film package 1 is taken out, the slide levers 14 are returned to the initial positions through the urging force of the springs 48. Then, the reset levers 44 rotated by being pushed by these slide levers 14 are rotated from positions shown in FIG. 10 to positions shown in FIG. 2 to push the control plate 38 in the direction of inserting the photo film package 1. With this arrangement, the engageable plate 20 is returned to the initial position shown in FIG. 6. Further, the stopper plate 52 is pushed by the end portion 14b of the slide lever 14, retracted from the area 60, through which the photo film package 1 passes, and returned to the initial position as shown in FIG. 5. With this arrangement, the photo film package 1 can be easily taken out of the film holder body 12, again using only one hand of the person performing the photography.

Accordingly, by use of the film holder 10 according to the present invention, even if the release lever is not operated, the photo film package 1 can be put in and taken out using only one hand, so that the user can concentrate on picture taking.

Figure 11:
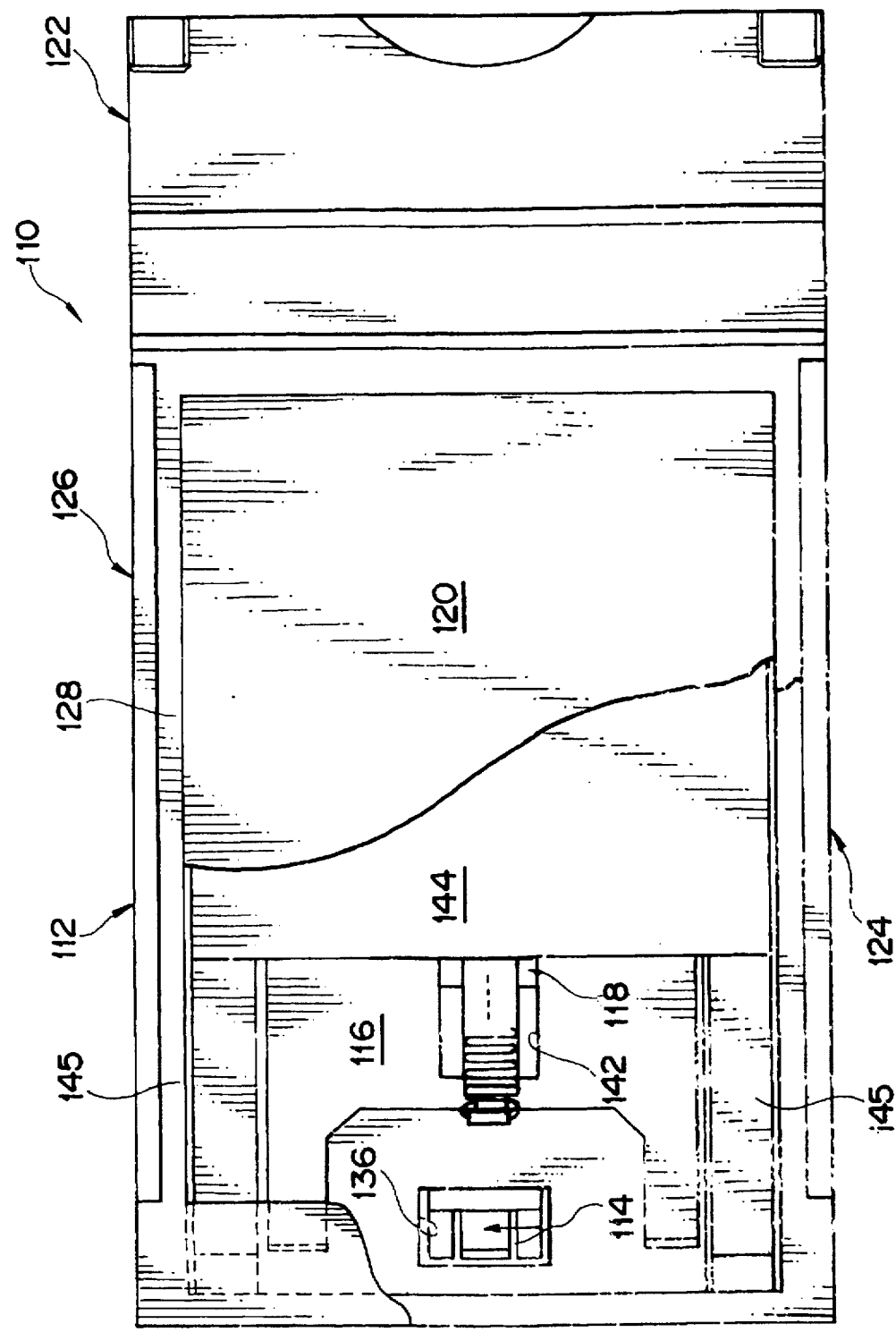
FIG. 11 is a plan view including a partially broken away portion of the film holder according to the second embodiment of the present invention.
Figure 12:
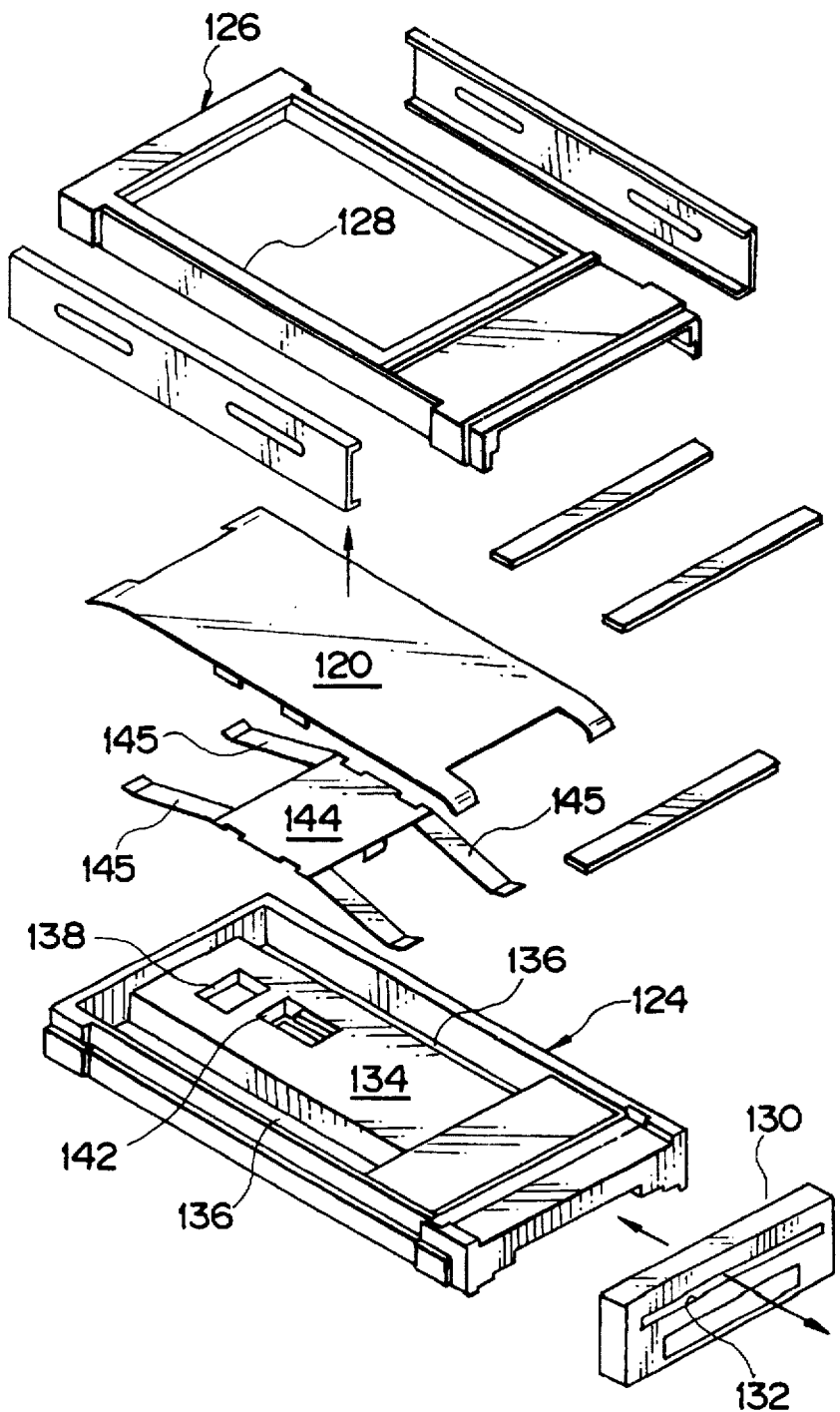
FIG. 12 is an exploded assembly view of the film holder according to the second embodiment of the present invention.
Figure 13:
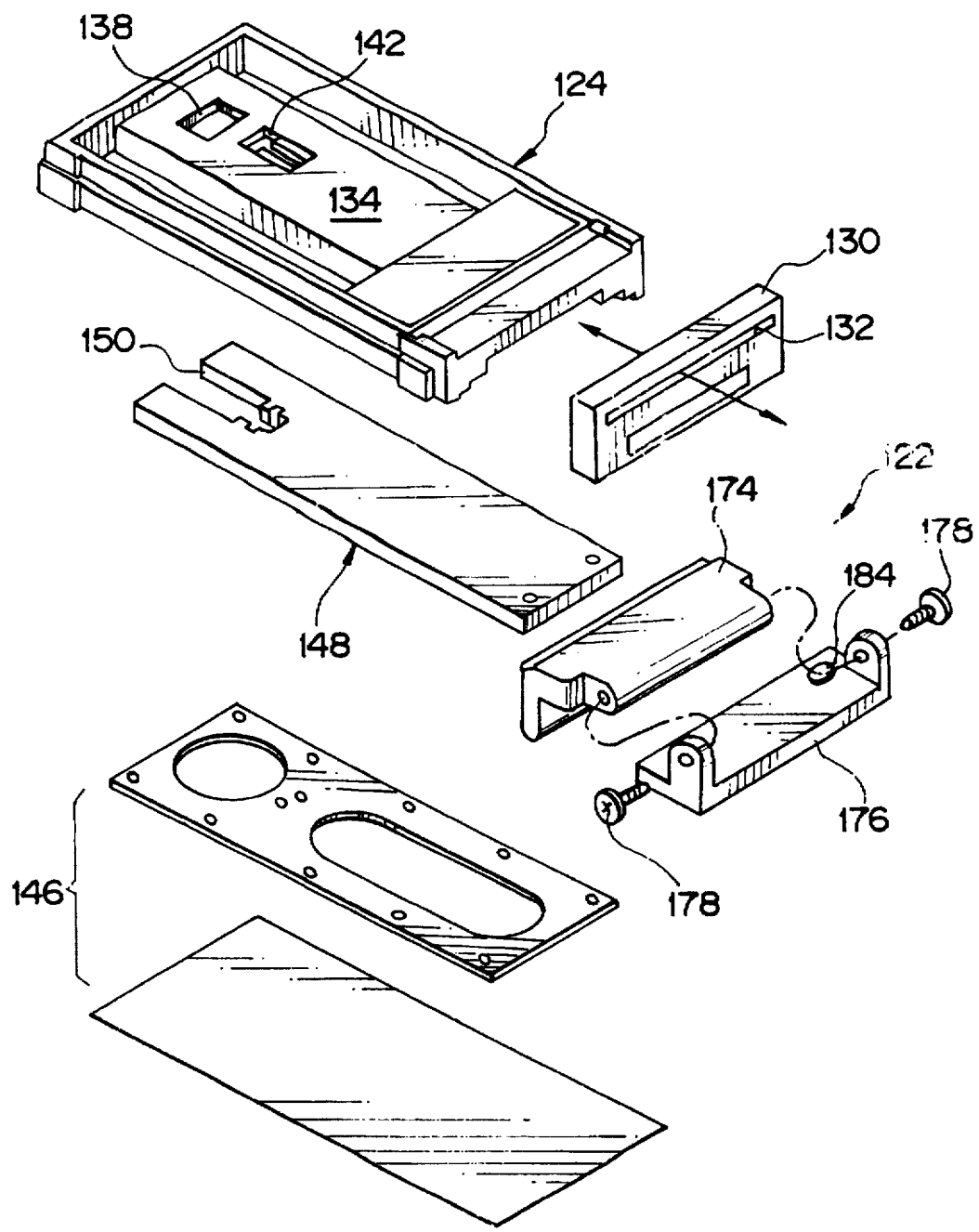
FIG. 13 is another exploded assembly view of the film holder according to the second embodiment of the present invention.
Figure 14:
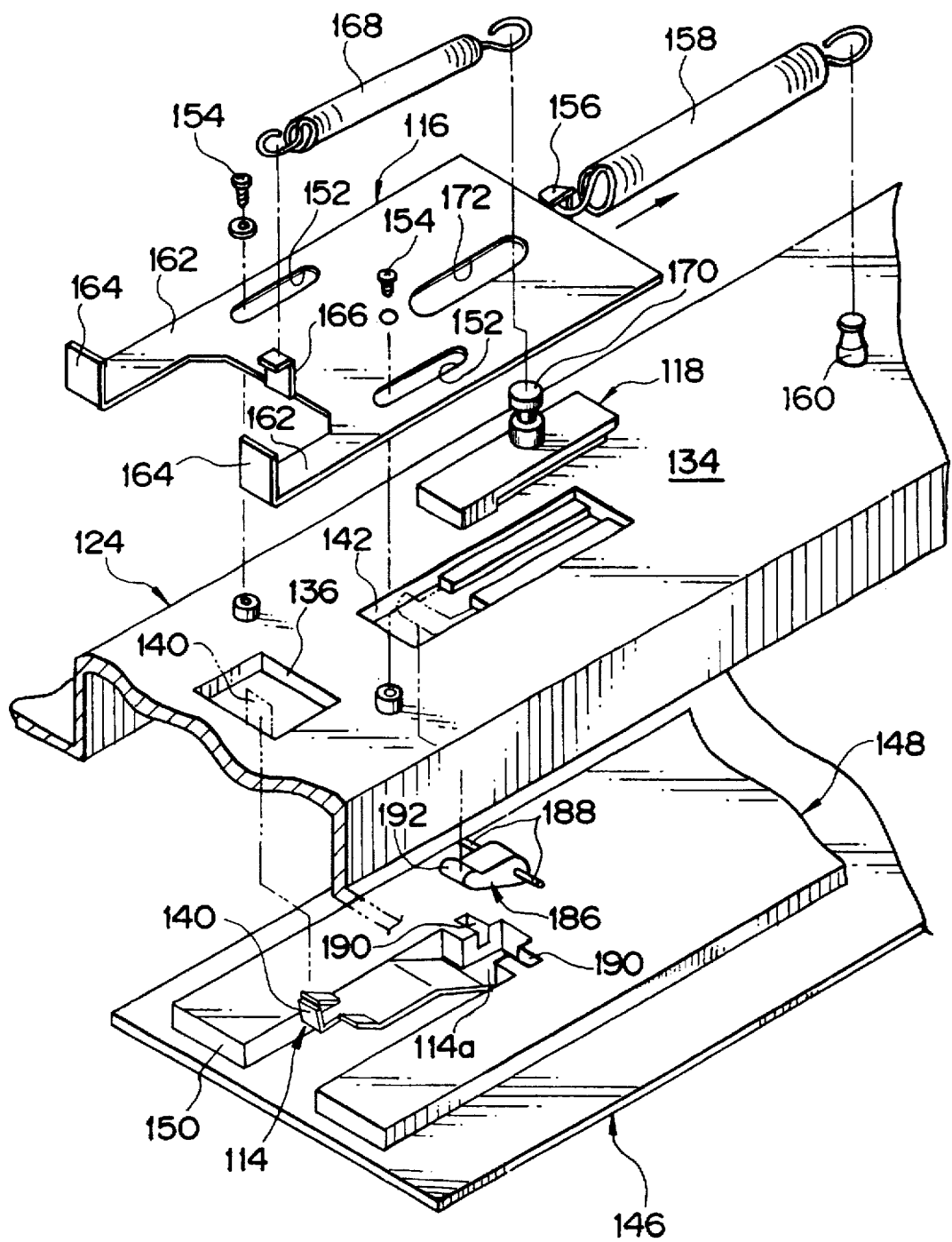
FIG. 14 is an exploded assembly view of the essential portions of the film holder according to the second embodiment of the present invention.

FIG. 11 is the plan view showing the second embodiment of a film holder 110 according to the present invention. FIGS. 12 to 14 are the assembled views of the film holder 110.

The film holder 110 includes a film holder 112, an engageable plate 114, a slide plate 116, a slidable element 118, a push plate 120, a pull-out mechanism 122 for the photo film package 1 and the like.

Firstly, the film holder body 112 will be described.

As shown in FIG. 11, the film holder body 112 is constituted by a bottom lid 124 and a top lid 126 and formed to provide a box shape. A rectangular exposure opening portion 128 is formed on the top surface of this film holder body 112, i.e., the outer surface of the top lid 126.

A cover 130 shown in FIG. 12 is fixed to the fight edge portion of the film holder body 112 in the drawing. An inlet/outlet opening 132 for the photo film package 1 is formed in this cover 130 in the longitudinal direction thereof, and the photo film package 1 is put into the film holder body 112 and taken out therefrom with the clip being the forward end, through this inlet/outlet opening 132.

As shown in FIGS. 15 and 16, the bottom lid 124 is formed to provide an uneven shape in section, which includes a convex portion 134 and concave portions 136. The convex portion 134 is formed along the directions of putting in mad taking out the photo film package 1 as indicated by two-dot chain lines in FIG. 15, and functions as a guide rail for the pull-out mechanism 122 to be described hereunder (hereinafter the convex portion 134 is referred to as "the guide rail").

An opening portion 138 is formed in the forward end portion of the guide rail 134, and an engageable pawl 140 of the engageable plate 114 to be described hereunder is projected from this opening portion 138 as shown in FIG. 14.

Furthermore, a guide groove 142 is formed in the vicinity of the opening portion 138 along the directions of putting in and taking out the photo film package 1. The slidable element 118 is slidably mounted in this guide groove 142. The slidable element 118 will be described hereunder.

On the other hand, in the concave portions 136, there are provided leg portions 145 of a sheet spring 144 for pressing and urging the push plate 120 in a direction indicated by an arrow in the drawing, i.e., a direction to the exposure opening portion 128.

Next, the engageable plate 114 will be described.

Figure 20:
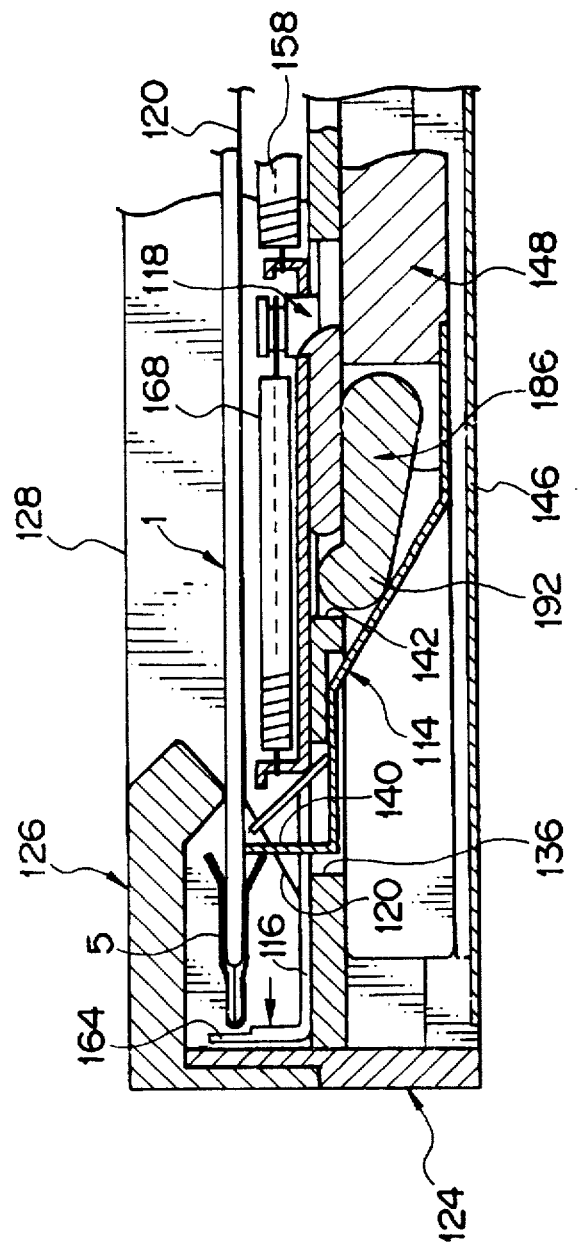
FIG. 20 is an explanatory view of operation of the essential portions of the film holder according to the second embodiment of the present invention.

The engageable plate 114 is formed of an elastic material, and the right end portion 114a thereof as shown in FIG. 14 is fixed to a plate-shaped cover 146 fastened to the bottom portion of the guide rail 134. Furthermore, the above-described engageable pawl 140 is bent up on the left end portion of the engageable plate 114. This engageable pawl 140 is projected from the opening portion 138 of the guide rail 134 through a cut-out groove 150 formed in an operating plate 148 to be described hereunder and engaged with the clip 5 of the photo film package 1 as shown in FIG. 20.

Next, the slide plate 116 will be described.

As shown in FIG. 14, the slide plate 116 is formed to provide a substantially rectangular shape, and disposed between the push plate 120 and the guide rail 134 (Refer to FIG. 18). Furthermore, a pair of slots 152 are formed on the slide plate 116 in parallel to the guide rail 134. The slide plate 116 is provided on the guide rail 134 by use of screws 154 secured through the slots 152 and disposed in a manner to be slidable along the slots 152, i.e., along the direction of putting in and taking out the photo film package 1.

A hook 156 is fixed to the rear end portion of the slide plate 116. This hook 156 is connected to a pin 160 implanted in the guide rail 134 through a spring 158. With this arrangement, the slide plate 116 is urged in the direction indicated by an arrow, i.e., the direction of taking out the photo film package 1 through the urging force of the spring 158.

Furthermore, two bifurcated arm members 162 are formed integrally on the forward end portion of the slide plate 116, and two stopper portions 164 are bent up on the forward end portions of these arm members 162. As shown in FIG. 20, the stopper portions 164 abut against the clip 5 when the photo film package 1 is inserted.

Further, as shown in FIG. 14, a hook 166 is fixed to the forward end edge portion of the slide plate 116. This hook 166 is connected to a pin 170 implanted in the slidable element 118, through a spring 168. Incidentally, as the spring 168, one weaker in the spring force than the above-described spring 158 is used. The slide plate 116 is disposed on the guide rail 134, whereby the pin 170 is projected through a slot 172 formed in the slide plate 116 and engaged with the spring 168. Furthermore, the slot 172 is formed along the guide rail 134. With this arrangement, the slide plate 116 is urged through the urging force of the spring 168 against the slidable element 118 in the direction of taking out the photo film package 1.

Next, the slidable element 118 will be described.

The slidable element 118 is slidably disposed in the guide groove 142 of the guide rail 134, and held, being clamped between the guide rail 134 and the slide plate 116. Furthermore, when the slide plate 116 is slidably moved from a position shown in FIG. 18 to a position shown in FIG. 20, the slidable element 118 is urged by the spring 168 in the direction of inserting the photo film package 1.

Next, the pull-out mechanism 122 will be described.

As shown in FIG. 13, the pull-out mechanism 122 includes the operating plate 148, a handle portion 174 and a clamping plate 176. The handle portion 174 is fixed to the rear end portion of the operating plate 148, and the clamping plate 176 is rotatably mounted on this handle portion 174 through pins 178.

Figure 19:
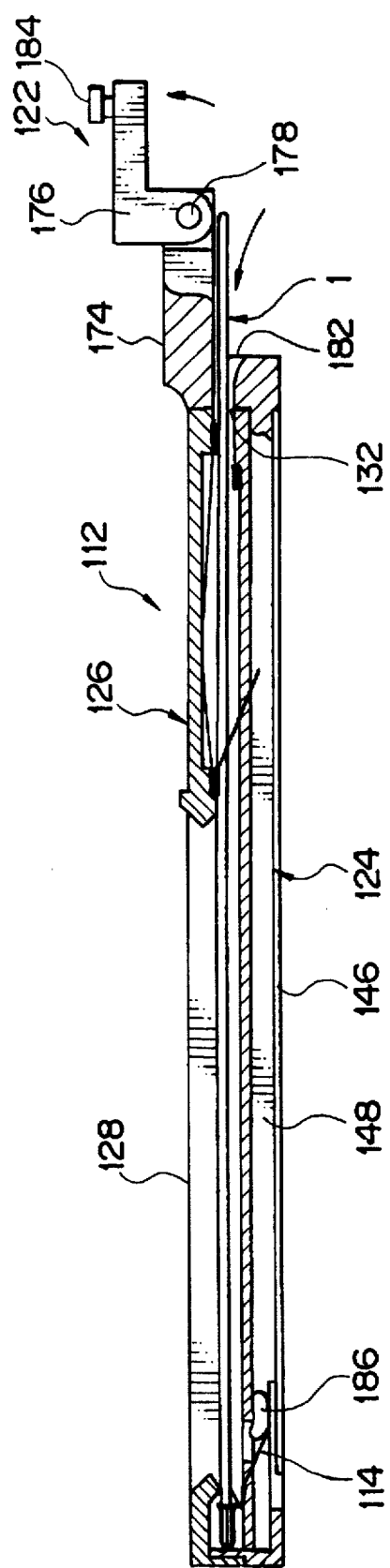
FIG. 19 is an explanatory view of the operation of the film holder according to the second embodiment of the present invention.

The operating plate 148 is disposed between the guide rail 134 and the cover 146 and provided in a manner to be slidable along the guide rail 134. As shown in FIG. 19, an opening portion 182 for putting in and taking out the photo film package 1 is formed under the handle portion 174. Accordingly, the photo film package 1 is inserted into the film holder body 112 through the opening portion 182 and the above-described inlet/outlet opening 132.

Figure 21:
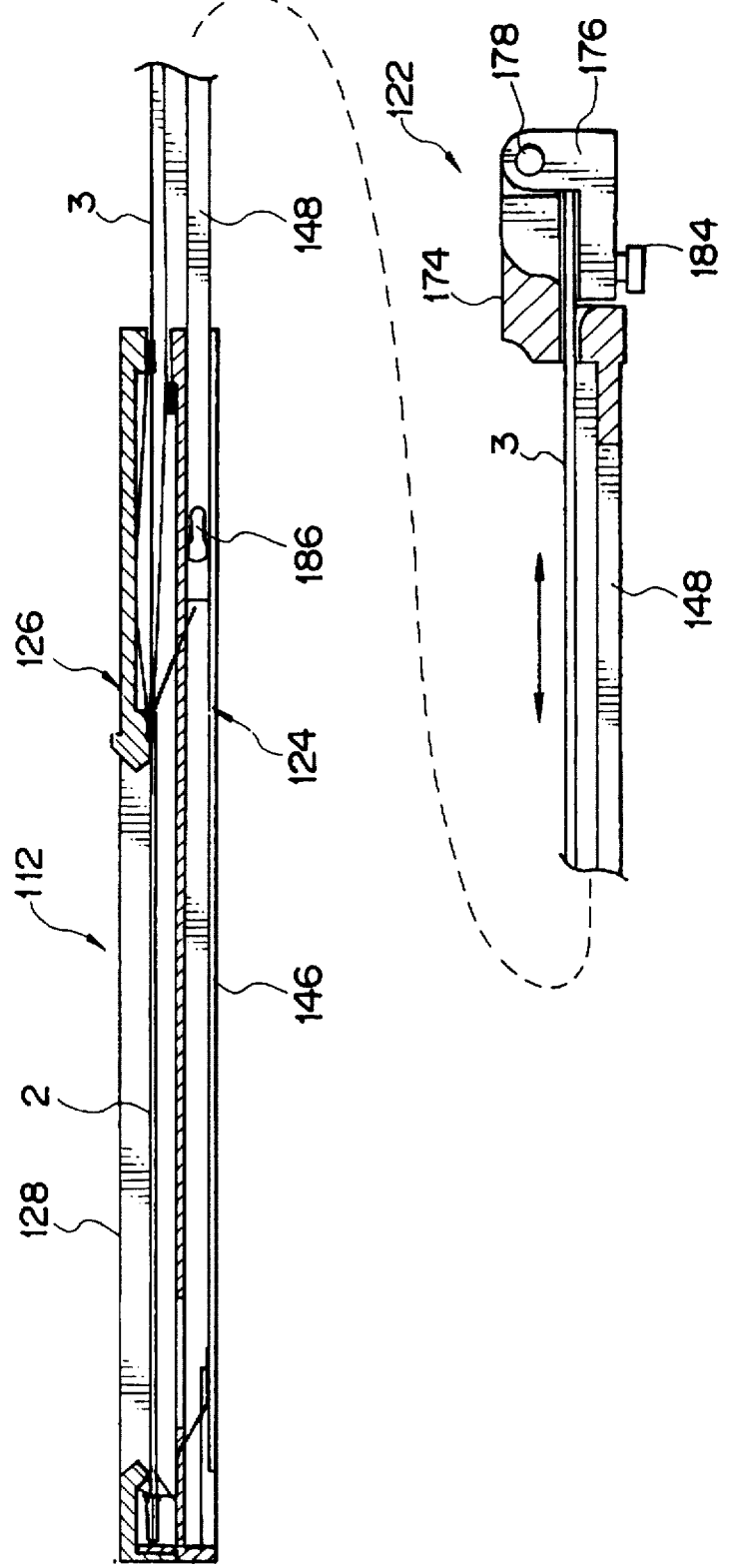
FIG. 21 is an explanatory view of the operation of the film holder according to the second embodiment of the present invention.

Furthermore, a stamp 184 is fixed to the surface of the clamping plate 176 as shown in FIG. 13. As shown in FIG. 21, when the light shielding envelope 3 is clamped between the handle portion 174 and the clamping plate 176, this stamp 184 can stamp a mark of "photographed" or the like onto the light shielding envelope 3.

On the other hand, a link 186 shown in FIG. 14 is provided at the forward end portion of the operating plate 148. Shafts 188 fixed to the opposite sides of the link 186 are loosely coupled into grooves 190 and 190 formed in the operating plate 148, whereby the link 186 can be rotated about the shafts 188. Furthermore, when the photo film package 1 is not inserted in the film holder body 112, the forward end portion 192 of the link 186 is pushed by the engageable plate 114 and positioned in the guide groove 142 of the slide plate 116 to suppress the movement of the slidable element 118 as shown in FIG. 18.

Next, description will be given of the operations of putting in and taking out the photo film package 1 by use of the film holder 110 having the above-described arrangement.

(1) Firstly, as shown in FIG. 19, the clamping plate 176 of the pull-out mechanism 122 is rotated in a direction indicated by an arrow and retracted from the opening position 182, and thereafter, the photo film package 1 is inserted into the film holder body 112 with the clip 5 being the forward end.

(2) When the photo film package 1 is inserted, the clip 5 of the photo film package 1 abuts against the stopper portions 164 of the slide plate 116, these stopper portions 164 are pushed by the photo film package 1 and moved together with the photo film package 1 in the direction of inserting the photo film package 1 from the positions shown in FIGS. 17 and 18. At this time, the slidable element 118 interlocks with the movement of the slide plate 116 to be urged in the direction of inserting the photo film package 1, however, abutted against the forward end portion 192 of the link 186, the slidable element 118 is suppressed in its movement.

(3) When the photo film package 1 is inserted into the final position, the clip 5 is engaged with the engageable pawl 140 of the engageable plate 114. With this arrangement, the film unit 2 (Refer to FIG. 22) is held in the film holder body 112.

Figure 22:
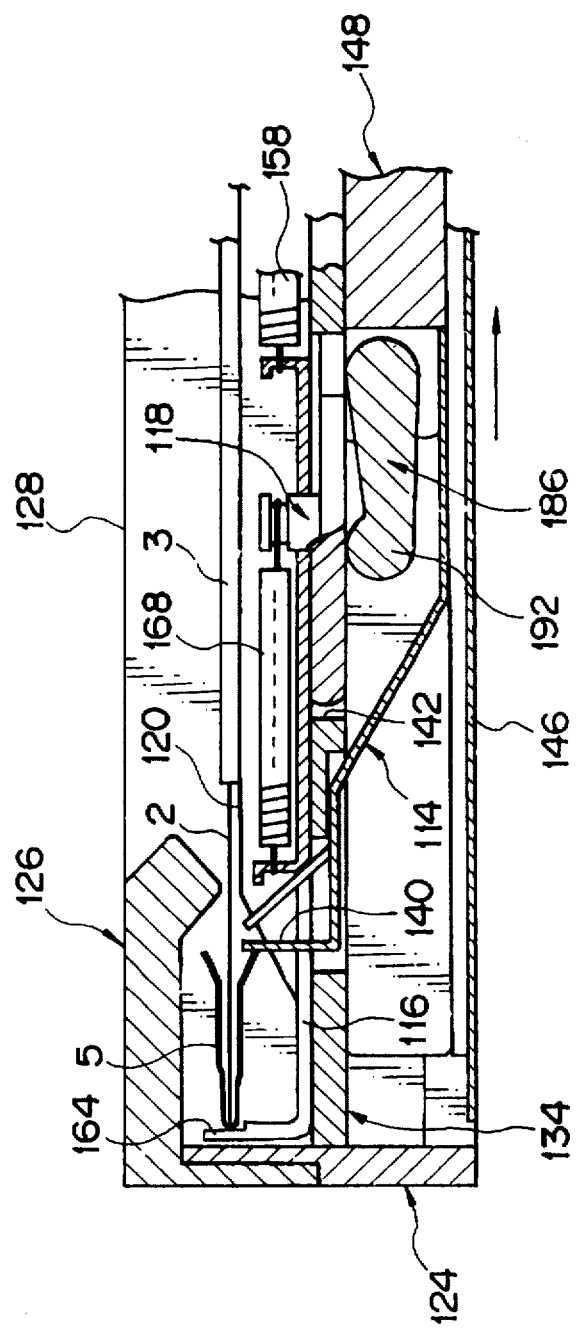
FIG. 22 is an explanatory view of operation of the essential portions of the film holder according to the second embodiment of the present invention.

(4) Next, when the photographing is performed, only the light shielding envelope 3 is held by the handle portion 174 of the pull-out mechanism 122 and the clamping plate 176 as shown in FIG. 21. Then, the operating plate 148 is pulled out of the film holder body 112 as shown in FIG. 22. With this arrangement, the light shielding envelope 3 together with the operating plate 148 is pulled out along the guide rail 134, whereby the light shielding envelope 3 is reliably pulled out without being inclined. When the light shielding envelope 3 is pulled out, as described above, the film unit 2 is held by the clip 5, whereby the photo film F of the film unit 2 is exposed through the exposure opening portion 128. This film unit 2 is pushed by the push plate 120 toward the exposure opening portion 128, so that the film unit 2 is exposed while being held in the film holder body 112. Furthermore, at this time, the control of the slidable element 118 by the link 186 is released, the slidable element 118 is moved through the urging force of the spring 168 in the direction of inserting the photo film package 1 to block the guide groove 142.

Figure 23:
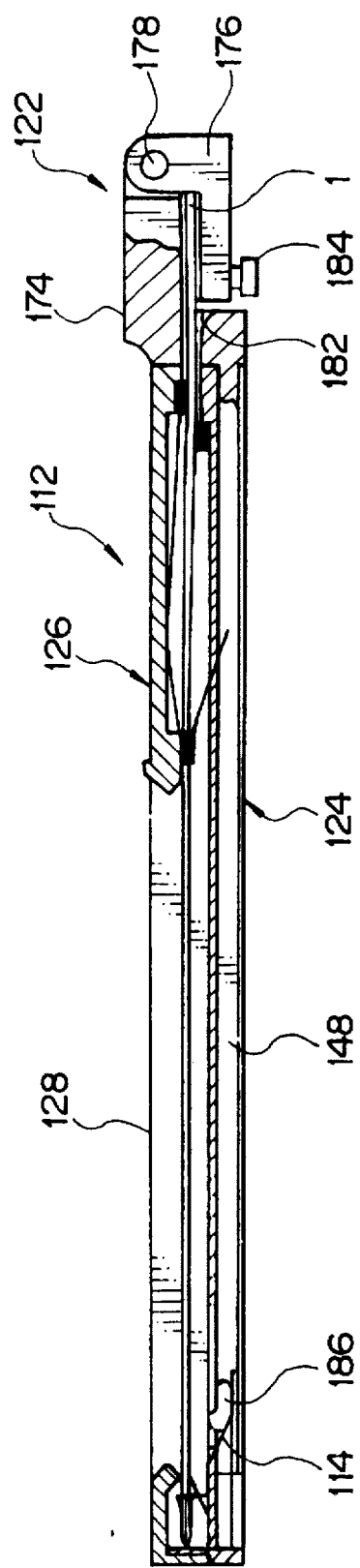
FIG. 23 is an explanatory view of the operation of the film holder according to the second embodiment of the present invention.
Figure 24:
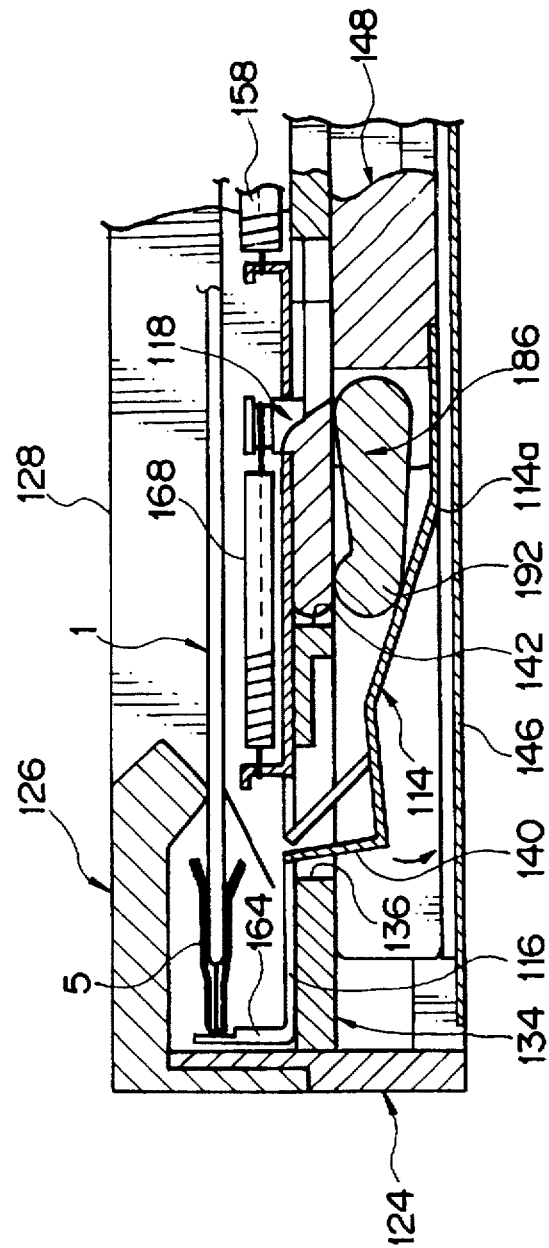
FIG. 24 is an explanatory view of operation of the essential portions of the film holder according to the second embodiment of the present invention.

(5) Subsequently, when the photographing is completed, the light shielding envelope is held by the handle portion 174 and the clamping plate 176 as shown in FIG. 21. Then, the operating plate 148 is housed in the film holder body 112 as shown in FIG. 23 and the film unit 2 is housed in the light shielding envelope 3 as shown in FIG. 24.

(6) At this time, the link 186 is pressed and abuts against the engageable plate 114, whereby the engageable plate 114 is elastically deformed, as centered about a fulcrum 114a, and flexed in a downward direction, so that the engagement with the engageable plate 114 is released.

Figure 25:
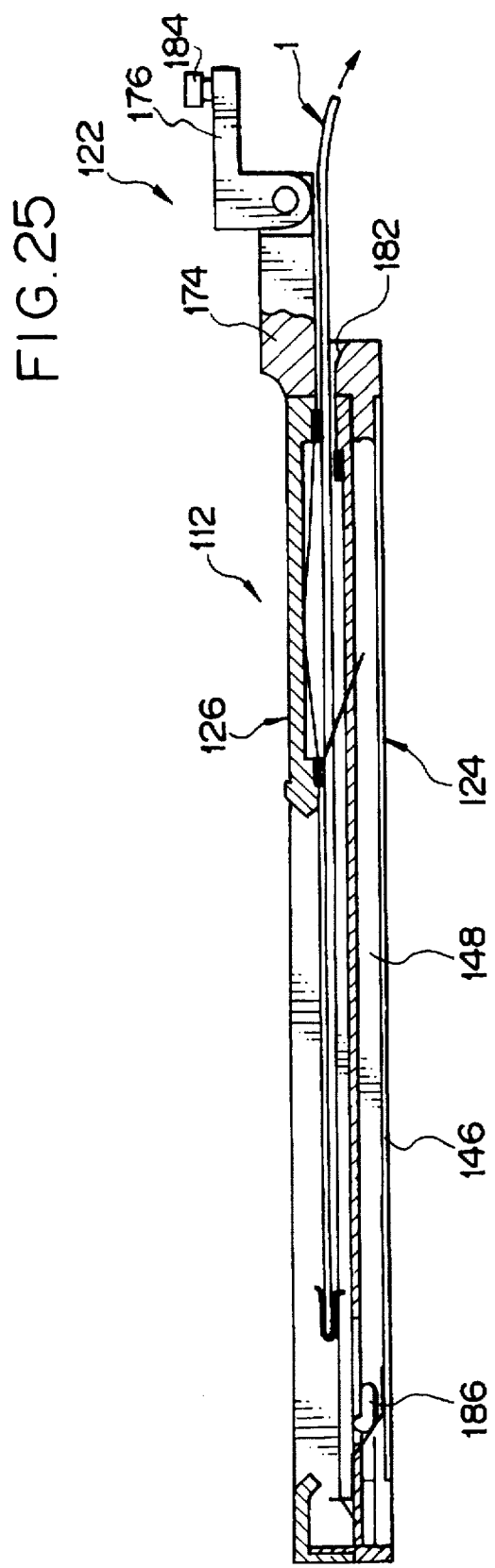
FIG. 25 is an explanatory view of the operation of the film holder according to the second embodiment of the present invention.

(7) At the time when the photo film package 1 is disengaged from the clip 5, the photo film package 1 is taken out of the film holder body 112 as shown in FIG. 25. With this arrangement, the photo film package 1 can be easily taken out of the film holder body 112.

Figure 26:
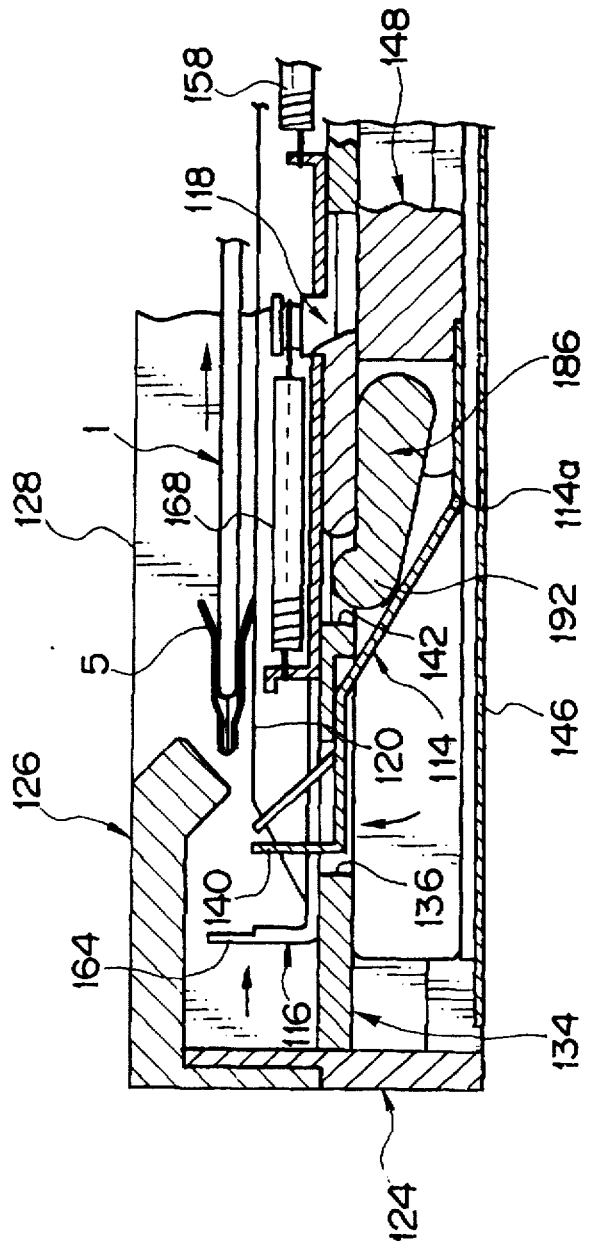
FIG. 26 is an explanatory view of operation of the essential portions of the film holder according to the second embodiment of the present invention.

(8) When the photo film package 1 is taken out, the slide plate 116 is returned to the initial position through the urging force of the spring 168 as shown in FIG. 26, whereby the slidable element 118 interlocks with this returning movement to return to the initial position as shown in FIG. 18. With this arrangement, pushed by the engageable plate 114 which has been elastically deformed, the link 188 is moved into the guide groove 142, and simultaneously the engageable plate 114 is returned to the initial position.

Accordingly, by use of the film holder 110 according to the present invention, the reliable pull-out of the light shielding envelope 3 can be secured, so that the inclination of the photographing frame, shift in focusing and the like can be avoided as compared with the conventional film holder.

Furthermore, the marking memos such as the stamp 184 is secured to the clamping plate 176 of the pull-out mechanism 122, so that the mark such as "photographed" can be stamped on the light shielding envelope 3. With this arrangement, the photo film package 1 which has completed the photographing can be easily discriminated. Incidentally, this stamp 184 may be secured to the handle portion 174.

As has been described hereinabove, by use of the film holder according to the present invention, the excessive operation such as the operation of the release lever is eliminated, so that the user can concentrate his attention at the photographing.

Furthermore, by use of the film holder according to the present invention, the light shielding envelope together with the operating plate is pulled out, so that the reliable pull-out of the light shielding envelope can be secured. With this arrangement, the inclination of the photographing frame and shift in focusing can be avoided as compared with the conventional film holder.

Further, the marking means is secured to the holding portion mounted on the rear end portion of the operating plate, so that the photo film package which has been fully exposed can be easily discriminated.

Figure 29:
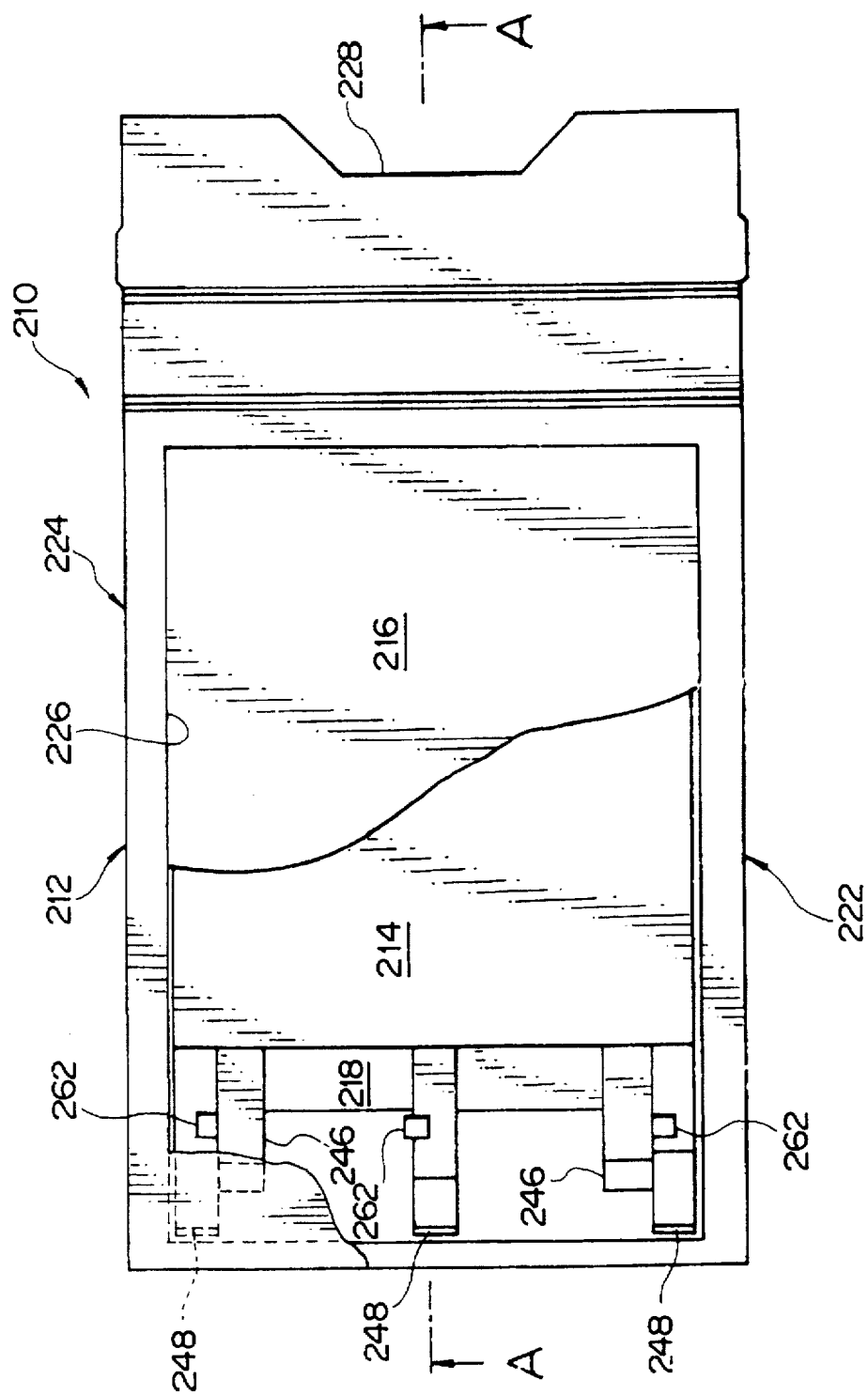
FIG. 29 is a plan view including a partially broken away portion of the film holder according to the third embodiment of the present invention.
Figure 30:
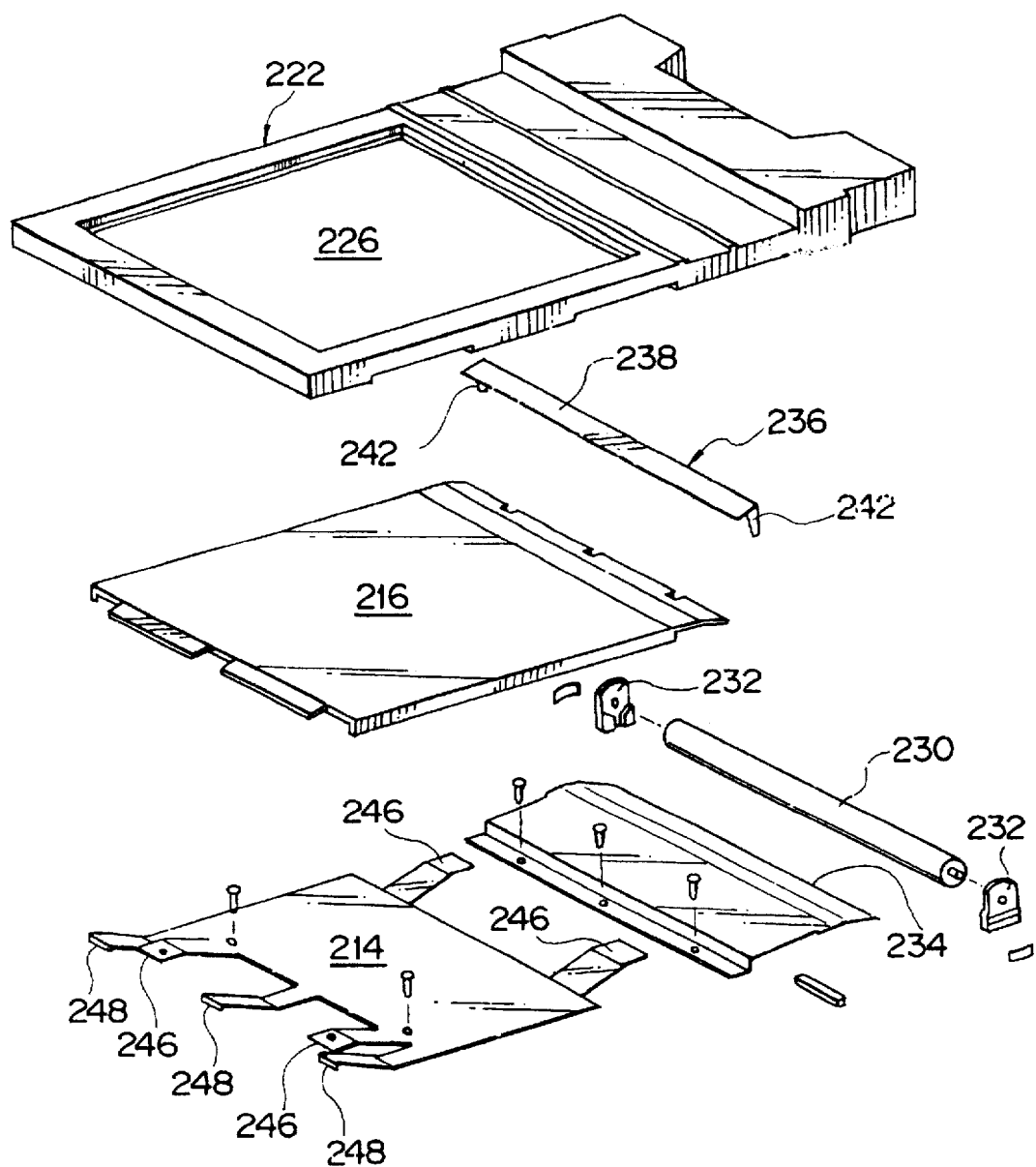
FIG. 30 is an exploded assembly view of the film holder according to the third embodiment of the present invention.
Figure 31:
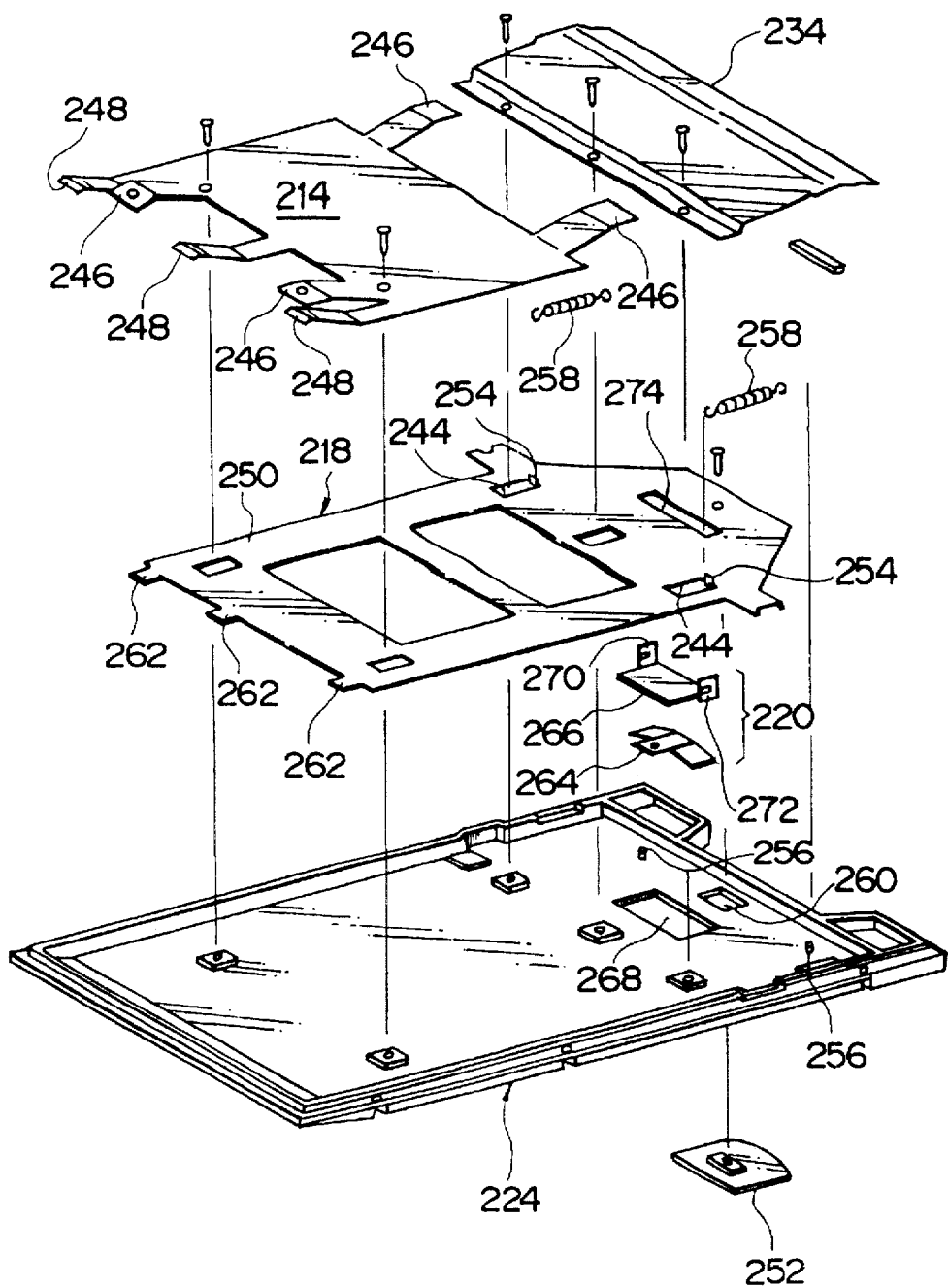
FIG. 31 is another exploded assembly view of the film holder according to the third embodiment of the present invention.
Figure 32:
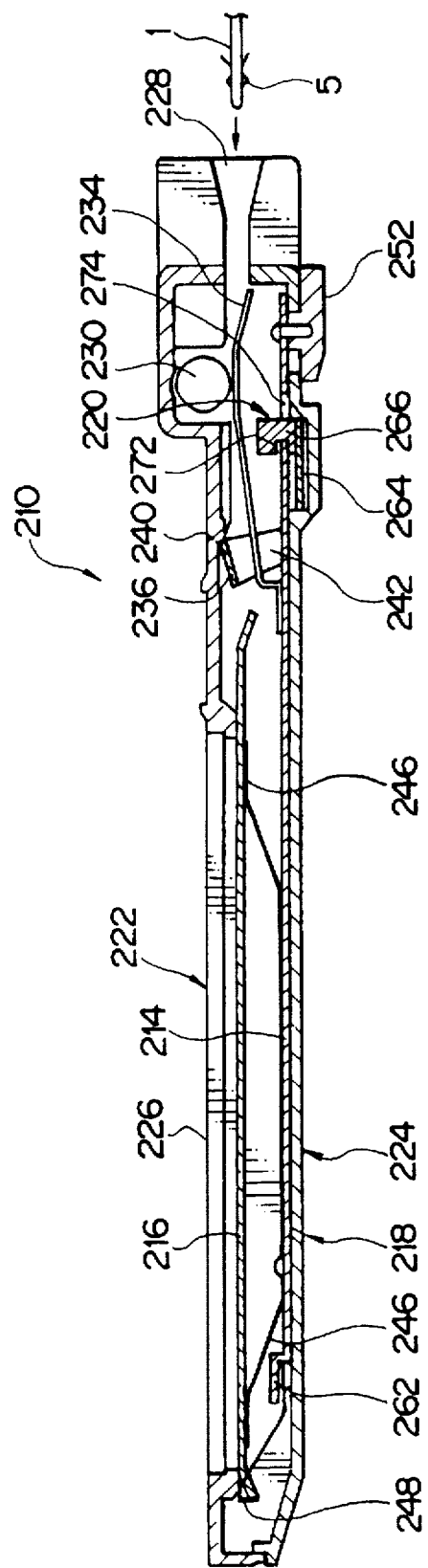
FIG. 32 is a sectional view taken along the line A—A in FIG. 29.

FIG. 29 is the plan view showing the third embodiment of a film holder 210, FIGS. 30 and 31 are the assembled view thereof and FIG. 32 is a sectional view thereof.

The film holder 210 has by a film holder body 212, an engageable plate 214, a push plate 216, a release lever 218 of the photo film package 1, a lock mechanism 220 of the release lever 218 and the like.

Firstly, the film holder body 212 will be described.

As shown in FIG. 29, the film holder body 212 is formed in a box with a bottom lid 224 and a top lid 222. A rectangular exposure opening portion 226 is formed on the front surface of this film holder body 212, i.e. the outer surface of the top lid 222.

An inlet/outlet opening 228 of the photo film package 1 is formed at the right edge portion of the film holder body 212 as shown in FIG. 29. The photo film package 1 is put into and taken from the film holder body 212 in the state that the chip 5 leads.

A roller 230 is located in the vicinity of the inlet/outlet opening 228 of the top lid 222 as shown in FIG. 30. The roller 230 is attached rotatably on the inner side of the top lid 222 through bearings 232 fixed on both edges. And, as shown in FIG. 32, the roller 230 is pressed on the surface of the plate spring 234 fixed in the vicinity of the inlet/outlet opening 228 of the bottom lid 224 with screws shown in FIG. 31. With this arrangement, light does not come in the film holder body 212 from the inlet/outlet opening 228.

Figure 34:
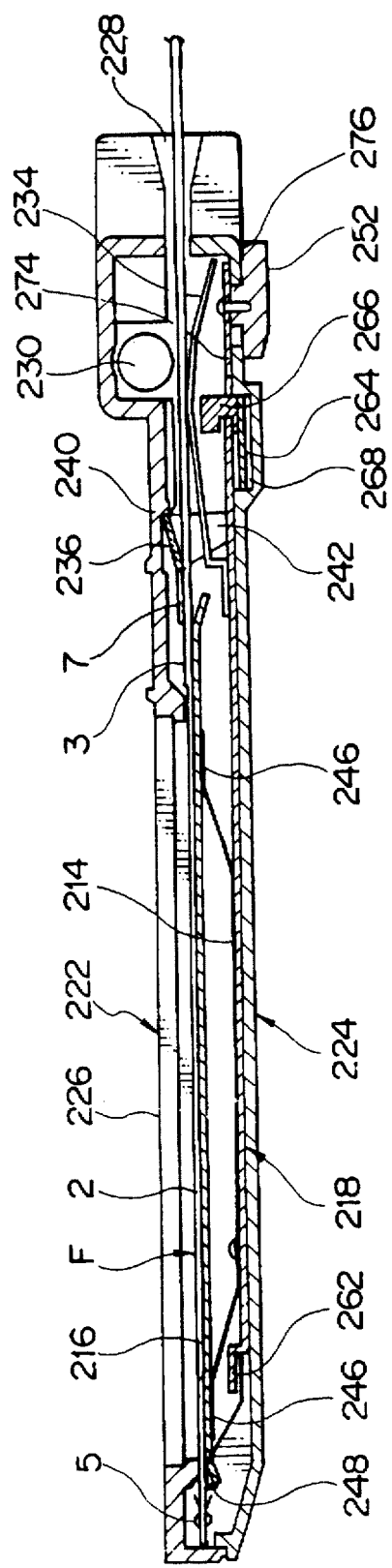
FIG. 34 is an explanatory view of the operation of the film holder according to the third embodiment of the present invention.

A long size stopper plate 236 is located in the vicinity of the roller 230 as shown in FIG. 30. A side portion 238 on the roller 30 is abutted and supposed by a corner potion 240 formed on the inner side of the top lid 222 shown in FIG. 32, whereby the stopper plate 236 is abutted the stopper tape 7 when the light shielding envelope 3 is taken out, as shown in FIG. 34. With this arrangement, the light shielding 'envelope 3 is prevented from dislodging from the film holder body 212. And, as shown in FIG. 31, convex pieces 242 formed on both edges in the stopper plate 236 are inserted into the rectangular openings 244 of the release lever 218. Therefore, when the release lever 218 is moved slidably in the left direction in FIG. 34, the stopper plate 236 is retracted from the position shown in FIG. 35 where the stopper plate 236 has been rotated about the side portion 238 clockwise in FIG. 34, that is, the abutting position with the stopper tape 7.

Next, the engageable plate 214 will be described.

Figure 33:
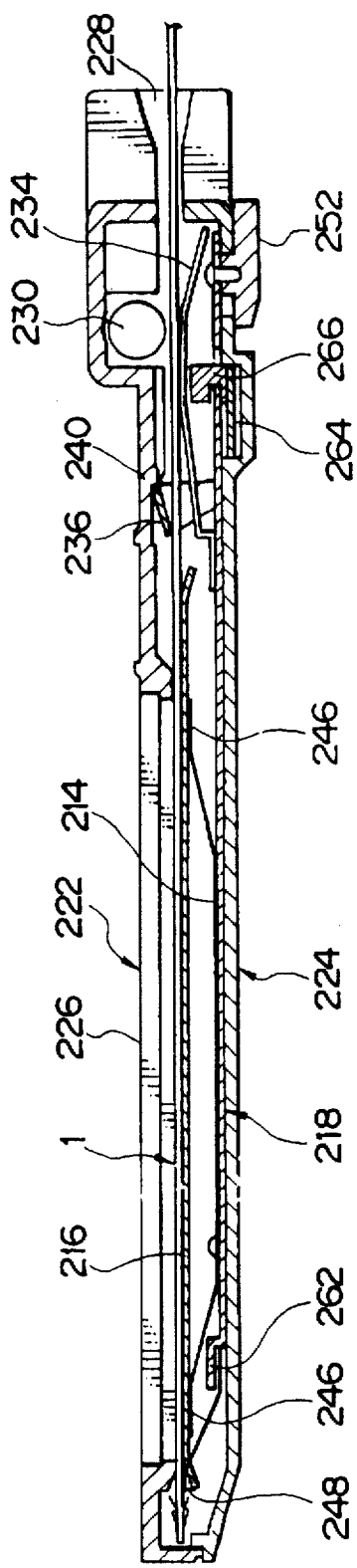
FIG. 33 is an explanatory view of the operation of the film holder according to the third embodiment of the present invention.

The engageable plate 214 is fastened to the bottom lid 224 as shown in FIG. 31. Furthermore, pairs of plate springs 246 are expanded from both sides of the engageable plate 214. The push plate 216 is pushed and compressed against the exposure opening 226 of the film holder body 212 by the plate springs 246 as shown in FIG. 32. And, three engageable pawls 248, are expanded from the left end portion of the engageable plate 214 in FIG. 31 at predetermined intervals. The engageable pawls 248, 248, 248 are engaged with the clip 5 of the photo film package 1 inserted into the final position in the film holder body 212, as shown in FIG. 33.

Next, the push plate 216 will be described.

As shown in FIG. 30, the push plate 216 is formed to provide a substantially rectangular shape, and held between the engageable plate 214 and the exposure opening 226. The push plate 216 is pushed and compressed toward the exposure opening 226 by the plate springs 246 of the engageable plate 214. Therefore, the push plate 216 can push and compress the photo film package 1 inserted in the film holder body 212 toward the exposure opening 226.

Next, the release lever 218 will be described.

The release lever 218 consists of a plate-shape body portion 250 and a hand lever 252. The body portion 250 is compressed in the right direction in FIG. 31, that is, in the direction of taking out the photo film package 1 by the compressing power of springs 258 attached between hooks 254 formed by bending the vicinity of the openings 244 and pins 256 implanted on the bottom lid 224.

The hand lever 252 is screwed with the right end portion of the body portion 250 through the opening 260 formed on the bottom lid 224. Therefore, the body portion 250 can be moved in the left direction against the compressing power of the springs 258 by operating the hand lever 252.

On the other hand, in FIG. 31, the left end portion of the body portion 250 is bent so as to form three engagement release pawls 262. The engagement release pawls 262, are located at the upper base portions of the engageable pawls 248, of the engageable plate 314, as shown in FIGS. 29 and 32. Therefore, the body portion 250 is pushed by the hand lever 252; whereby the engagement release pawls 262, are moved slidably in the left direction in FIG. 31, and then, abutted to the engageable pawls 248, so that the engageable pawls 248, can be retracted from the engaged position with the clip 5 of the photo film package 1 as shown in FIG. 35.

Next, the lock mechanism 220 will be described.

As shown in FIG. 31, the lock mechanism 220 has a plate spring 264 and a locking plate 266. The locking plate 266 is located on a rectangular concave portion 268 fonned on the bottom lid 224 through the plate spring 264. Convex pieces 270 are formed by bending on the both sides of the rocking plate 266. Groove portions 272 formed by the convex pieces 272 are engaged with a rectangular opening 274 formed on the body portion 250 of the release lever 218.

Figure 35:
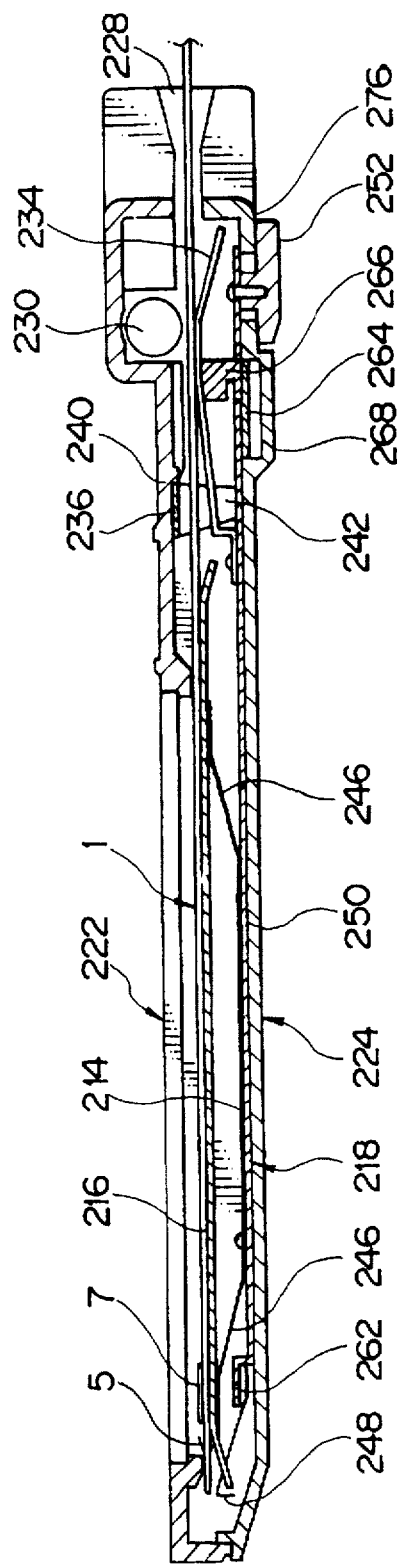
FIG. 35 is an explanatory view of the operation of the film holder according to the third embodiment of the present invention.

Further, when the body portion 250 is moved in the left direction in FIG. 31 (the direction of releasing the engagement), the locking plate 266 is pushed out from the opening 274 by the compressing power of the plate spring 264 as shown in FIG. 35 since the opening 274 is located over the convex pieces 270. Therefore, the return of the release lever 218 is locked by the convex pieces 270.

Figure 36:
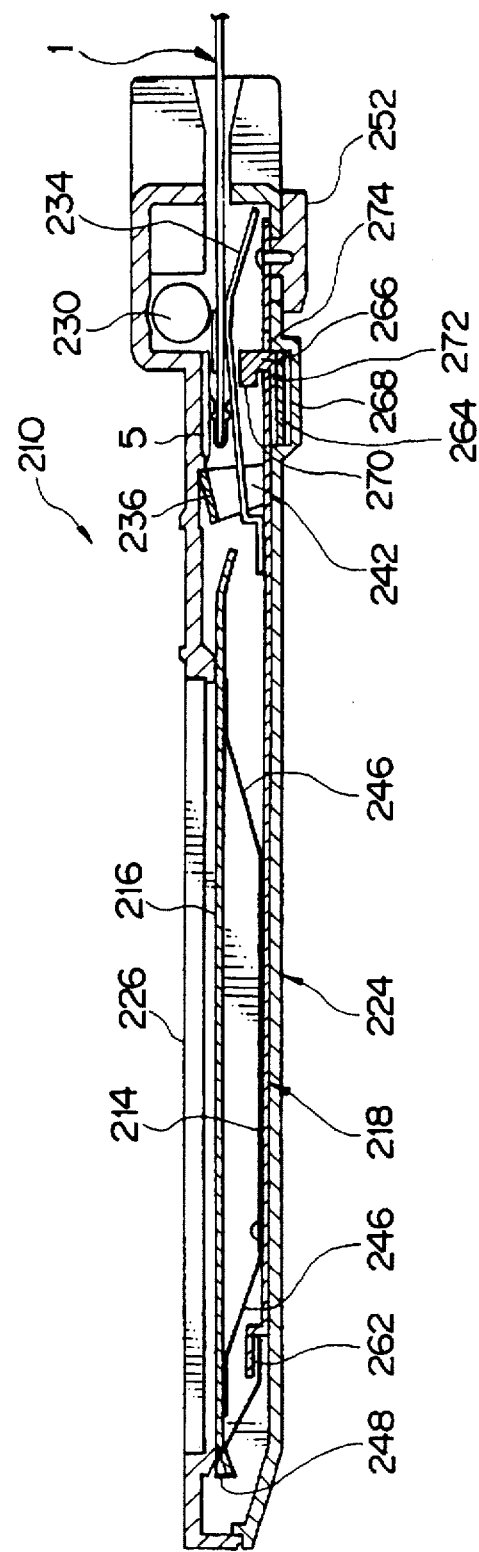
FIG. 36 is an explanatory view of the operation of the film holder according to the third embodiment of the present invention.

Moreover, the locking plate 266 is pushed by the plate spring 234, and then returned to the former position shown in FIG. 32 by the elastic transformation of the plate spring 234 generated when the clip 5 passes between the roller 230 and the plate spring 234, as shown in FIG. 36. Therefore, the release lever 218 is returned to the former position shown in FIG. 32 by the compressing power of the springs 258 since the lock is released.

Next, description will be given of the operations of putting in and taking out the photo film package 1 by use of the film holder 210 having the above-described arrangement.

(1) Firstly, as shown in FIG. 32, the photo film package 1 is inserted into the film holder body 112 with the clip 5 being the forward end.

(2) When the photo film package 1 is inserted into the final position as shown in FIG. 33, the clip 5 is engaged with the engageable pawls 248, whereby the film unit 2 is held in the film holder body 212.

(3) Next, when the photographing is performed, the light shielding envelope 3 is taken out from the film holder body 212 to the position where the stopper tape 7 is engaged with the stopper plate 236, and then, the film unit 2 is held by the clip 5, whereby the photo film F of the film unit 2 is exposed through the exposure opening portion 226. This film unit 2 is pushed by the push plate 216 toward the exposure opening portion 226, so that the film unit 2 is photographed in a state the photo film is held in the exposure position.

(4) Subsequently, when the photographing is completed, the light shielding envelope 3 is stored in the film holder body 212 and the film unit 2 is stored in the light shielding envelope 3 as shown in FIG. 35.

(5) The film unit is stored in the light shielding envelope, then, the hand lever 252 is operated to thereby slidably move the body portion 250 of the release lever 218 in the left direction, whereby the engageable pawls 248, are retracted from the engaged portion with the clip 5 by the engagement release pawls 262, of the body portion 250. At this time, the locking plate 266 is engaged with the opening 274, therefore, the body portion 250 of the release lever 218 is locked not to return. That is, through the hand lever 252 is left from an operating hand, there is no effect on the operation since the release lever 218 is locked thereat.

Moreover, at this time, the stopper plate 236 is retracted from the abutting position with the stopper tape 7.

(6) Next, when the engagements with the clip 5 and the stopper tape 7 are released, the photo film package is taken out from the film holder body. And, when the clip 5 passes over the plate spring 234 during taking out the photo film package, the locking plate 266 is pushed by the plate spring 234 as shown in FIG. 36 to thereby return to the former position shown in FIG. 32. Therefore, the lock of the release lever is released and the release lever 218 is returned to the former position by the compressing power of the springs 258 (see FIG. 31) interlocking the return of the locking plate 266. Further, the stopper plate 236 is returned to the former position.

Accordingly, by use of the film holder 210 according to the present invention, the release lever 218 is locked after the release operation, so that the photo film package can be taken out easily and safely. Further, the photo film package 1 can be put in and taken out by one hand, therefore, the complicated operation can be avoided and the reliable pull-out of the photo film package 1 can be assured as compared with the conventional film holder, wherein the photo film package 1 must be taken out with both hands.

Furthermore, a mark 276 showing that the release lever 218 is locked at the release position is made in the vicinity of the hand lever 252 of the film holder 212 shown in FIG. 35. The mark 276 is located at the position which is exposed when the hand lever 252 is pushed. Therefore, it can be easily determined whether the engagement with the clip 5 of the engageable pawl 248 is released or not by whether the mark 276 can be seen or not.

Incidentally, in this embodiment, the release lever 218 is returned when the photo film package 1 is taken out, however, this invention should be limited to this, the release lever 218 may be returned when the next photo film package is inserted.

It is also possible to provide the marking means for the film holder of the embodiment described in FIGS. 29–36.

Figure 37:
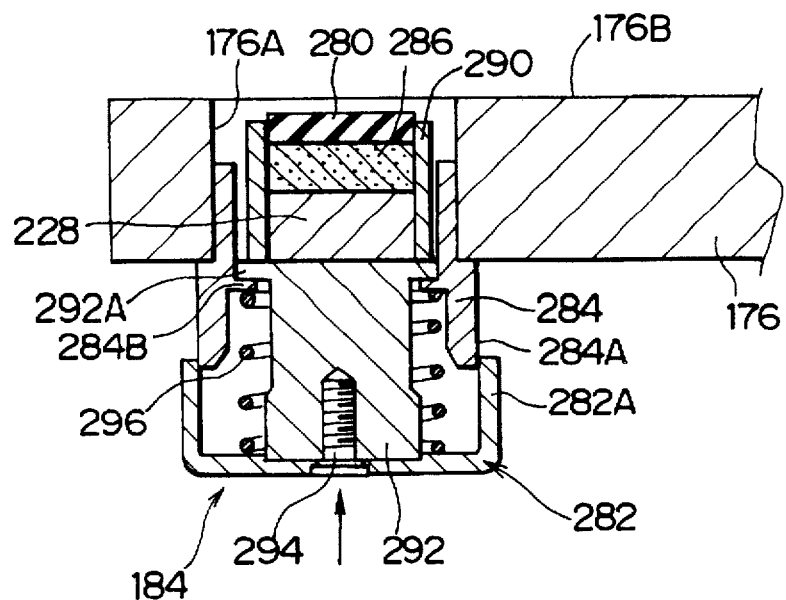
FIG. 37 is a cross-sectional view showing the structure of a stamp.
Figure 38:
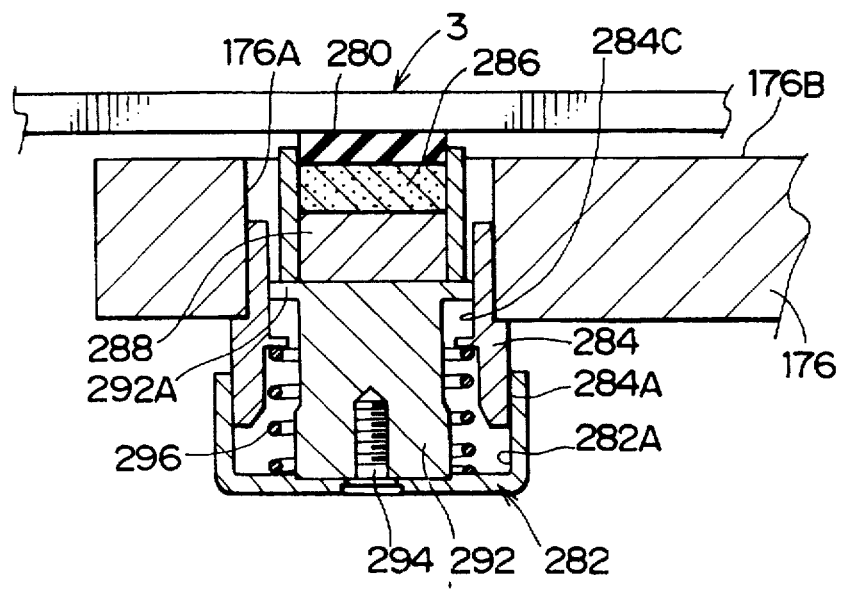
FIG. 38 is a cross-sectional view showing a stamp putting a mark on a light-shielding envelope.

As shown in FIG. 13, a stamp 184 is fixed to the clamping plate 176. As shown in FIG. 37, the stamp 184 has a porous material 280, a pushbutton 282 and a pushbutton guide 284, and is fixed to the clamping plate 176 being inserted into a hole 176A of the clamping plate 176 so that the porous material 280 faces a handle portion 174.

A printing surface, which says "the photographing has been completed", is formed on the surface of the porous material 280, and the porous material 280 is kept in a cylindrical holder 290 with a sponge 286, which has absorbed stamp ink, and a mounting member 288 composed of the sponge 286. The holder 290 is fixed on the top surface of a pin 292. The pin 292 is placed in the cylindrical pushbutton guide 284, and the lower portion thereof is fixed to the pushbutton 282 by a screw 294.

The pushbutton 282 is shaped as a cup, and an inner circumferential surface 282A thereof is guided to an outer circumferential surface 284A of the pushbutton guide 284. And a spring 296 is placed between the pushbutton 282 and the pushbutton guide 284. The pushbutton 282 is biased downwardly as shown in FIG. 37 by a force of the spring 296. The lower flange portion of the pin 292 is abutted against a stopper piece 284B, so that the pushbutton 282 is positioned at a position as shown in FIG. 37. In this case, the porous material 280 is positioned at a position recessed from a surface 176B of the clamping plate 176.

According to the stamp 184 structured as mentioned above, first, a light-shielding envelope 3 is positioned between the handle portion 174 and the clamping plate 176. Then, when an operator pushes the pushbutton 282 with his finger in a direction of an arrow as shown in FIG. 37, the flange potion 292A of the pin 292 moves upwardly along an inner circumferential surface 284C of the pushbutton guide 284, and the porous material 280 protrudes from a surface 176A of the clamping plate 176 to put a mark, which memos that photographing has been performed. After marking, when an operator takes his finger off the pushbutton 282, the pushbutton 282 is returned to the original position as shown in FIG. 37 by the force of the spring 296. This operation of the strop 284 can be carried out after the photographing of a photo film F.

Accordingly, if the stamp 184 is used, it can be easily determined whether or not the photographing of the photo film F in a photo film package 1 has been completed.

Figure 39:
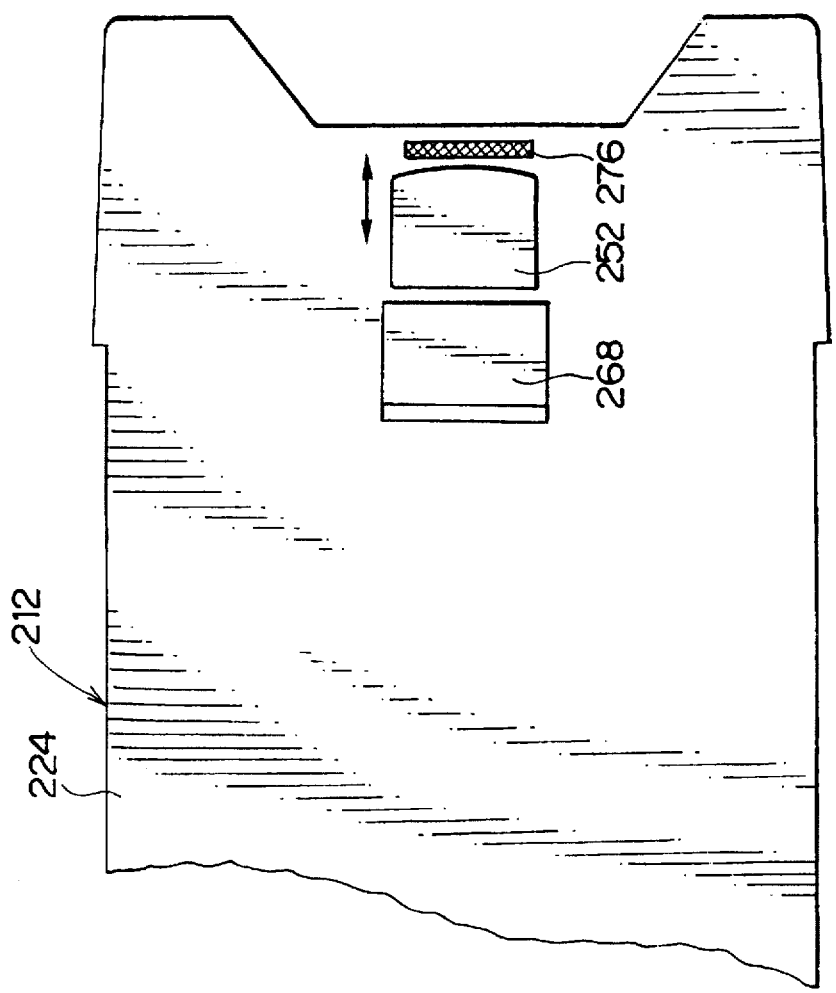
FIG. 39 is a rear elevation of a film holder body showing a hand lever moving to a releasing position of a release lever and a mark is exposed.

As shown in FIGS. 35 and 39, a mark 276 is put close to a hand lever 252 of a film holder body 212.

Figure 40:
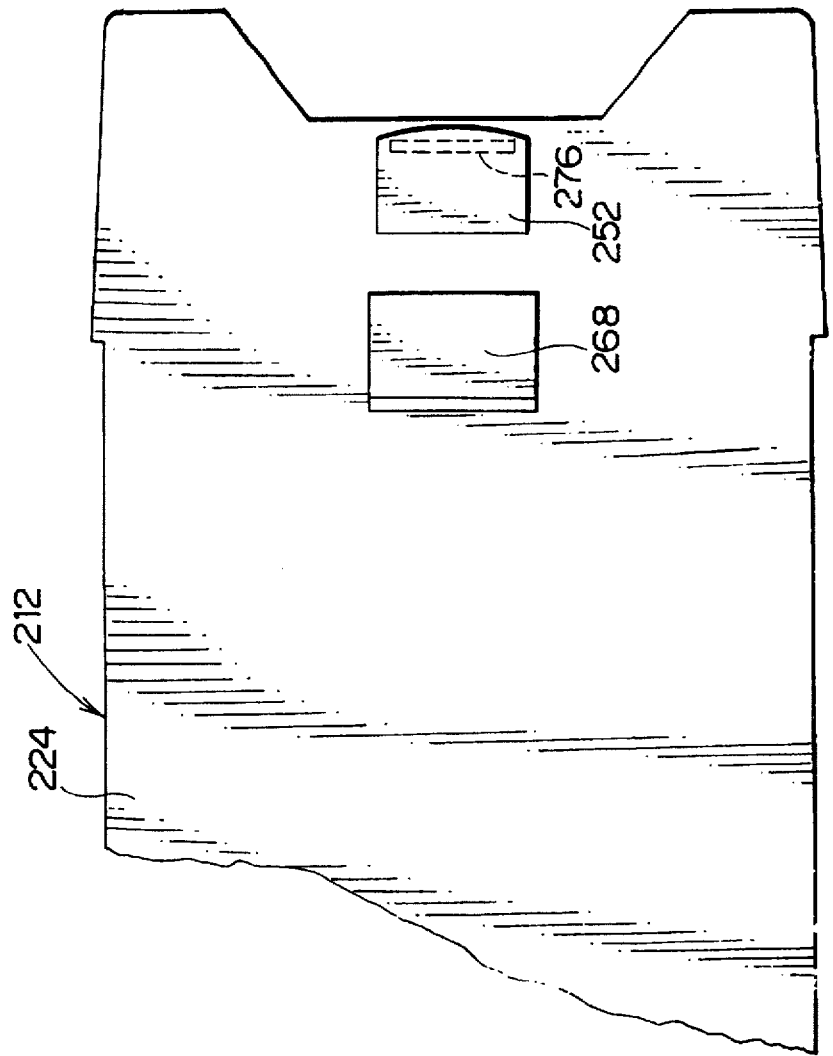
FIG. 40 is a rear elevation of a film holder showing that a mark is hidden by a hand lever.

The mark 276 shows that a release lever 218 is locked at a releasing position. That is, the mark 276 exposes itself when the hand lever 252 is pushed in a releasing direction of the release lever 218, and the mark 276 is hidden by the hand lever 252 when the hand lever 252 returns to the original position as shown in FIG. 40. As a result, it can be easily determined whether or not the engagement with a clip 5 of an engageable pawl 248 is released based on whether the mark 276 can be seen from outside the film holder body 212.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film holder for housing a photo film package including a film unit secured at the forward end edge portion of a photo film thereof with a clip (5), and a light-shielding envelope (3) provided with an insert opening to be closed by the clip and a dislodging preventing member (7) secured in the vicinity of the insert opening, for light-shieldingly housing the photo film, comprising:

a film holder body (12) formed therein with an inlet/outlet opening (34) for the photo film package and an exposure opening portion (32) for exposing the photo film;

a movable member (14; 116) slidably provided in the film holder body, urged in a direction of taking out the photo film package and abutted against the clip of the film unit to be moved together with the photo film package against the urging force in a direction of inserting the photo film package;

a first engageable member (64, 66; 140) provided in the film holder and engaged with the clip to hold the film unit in the film holder body when the photo film package is inserted into the final position;

a slidable member (16; 118) slidably mounted in the film holder body and urged in a direction of inserting the photo film package;

a second engageable member (53) provided on the slidable member, for interlocking with the movement of the movable member in the direction of inserting the photo film package, to be projected into an area through which the photo film package passes, and to be engaged with the dislodging preventing member of the light-shielding envelope, and, for interlocking with the movement of the movable member in the direction of taking out the photo film package to be retracted from the area, through which the photo film package passes;

a releasing means (38; 186) for interlocking with movement of the slidable member in the direction of taking out the photo film package to retract the first engageable member from the position of being engaged with the clip, to thereby release the engagement with the clip;

a push member (22; 120) for interlocking with the movement of the slidable member in the direction of taking out the photo film package to push the film unit toward the exposure opening portion and for interlocking with the movement of the slidable member in the direction of inserting the photo film package to be retracted from the area, through which the photo film package passes; and a returning means (44; 116, 118, 186) for interlocking with the movement of the movable member in the direction of taking out the photo film package to return the first engageable member to the position of being engaged with the clip; wherein:

during the operation of inserting the photo film package into the film holder body, the clip abuts against the movable member to move the movable member in the direction of inserting the photo film package, whereby the second engageable member is projected into the area, through which the photo film package passes, and the clip is engaged with the first engageable member when the photo film package is inserted into the final position;

during the operation of pulling out the light shielding envelope, the dislodging preventing member of the light-shielding envelope abuts against the second engageable member, whereby the slidable member is moved in the direction of taking out the light-shielding envelope, the releasing means releases the engagement of the first engageable member with the clip and the push member pushes the film unit toward the exposure opening portion;

during the operation of inserting the light-shielding envelope, the slidable member returns to the initial position through its urging force, whereby the push member returns to the initial position, from which the push member has been retracted from the film unit; and during the operation of taking out the light-shielding envelope together with the film unit, the movable member returns to the initial position through its urging force, whereby the second engageable member returns to the initial position, from which the second engageable member has been retracted from the passing area of the light-shielding envelope, and the returning means returns the first engageable member to the position of being engaged with the clip.

2. A film holder as set forth in claim 1, wherein a marking means for stamping a mark on the light-shielding envelope is secured to the film holder.

3. A film holder (210) for housing a photo film package including a film unit secured at the forward end edge portion of a photo film thereof with a clip and fixed at the backward end edge portion with a leader portion, and a light-shielding envelope provided with an insert opening to be closed by the clip and a dislodging preventing member secured in the vicinity of the insert opening, for light-tightly housing the photo film, comprising:

a film holder body (212) formed with an inlet/outlet opening for the photo film package and an exposure opening portion for exposing the photo film;

a first engageable member (248) engaged with the clip to hold the film unit in the film holder body when the photo film package is inserted into the final position;

a second engageable member (236) provided in the film holder body and engaged with the dislodging preventing member of the light-shielding envelope;

a push plate (216) provided in the film holder body, for pushing the film unit toward the exposure opening portion;

a releasing member (218) compressed in the direction of taking out the photo film package in the film holder body and moved against a compressing force, to thereby release an engagement with the film unit by the first engageable member and an engagement with the dislodging preventing member by the second engageable member; and locking means for locking the releasing member (218) in a release position, and for releasing the lock of the releasing member when the photo film package is taken out or is inserted, said locking means comprising a first plate spring (264) and a locking plate (266).

4. A film holder as set forth in claim 2, wherein a marking means for stamping a mark on the light-shielding envelope is secured to said film holder body.

5. A film holder as set forth in claim 2, wherein a mark indicating that said release lever is locked at said release position is made on said film holder body.

6. A film holder for housing a photo film package including a film unit secured at the forward end edge portion of a photo film thereof with a clip, and a light-shielding envelope provided with an insert opening to be closed by the clip and a dislodging preventing member secured in the vicinity of the insert opening, for light-shielding housing the photo film, comprising:

a film holder body formed therein with an inlet/outlet opening for the photo film package and an exposure opening portion for exposing the photo film;

an engageable member provided in the film holder body, for being engaged with the clip to hold the film unit in the film holder body when the photo film package is inserted into the final position in the film holder body;

a releasing means for interlocking with the movement of the light-shielding envelope in the direction of taking out the light-shielding envelope to retract the engageable member from the position of being engaged with the clip, to thereby release the engagement with the clip;

a returning means for interlocking the movement of the photo film package in a direction of taking out the photo film package to return the engageable member to the position of being engaged with the clip; and an operating plate movably insertable and removable in the film holder body and movably insertable and removable together with the light-shielding envelope.

7. A film holder as set forth in claim 6, wherein a marking means for stamping a mark on the light shielding envelope is secured to said film holder body.

8. A film holder as set forth in claim 6, further comprising a clamping plate capable of holding a rear end portion of the photo film package housed in said film holder body, said clamping plate being secured to a rear end portion of said operating plate.

9. A film holder as set forth in claim 8, further comprising marking means for stamping a mark on the light shielding envelope, said marking means being secured to said clamping plate.

* * * * *